(12) United States Patent
Tajima et al.

(10) Patent No.: US 11,894,523 B2
(45) Date of Patent: Feb. 6, 2024

(54) ELECTRONIC DEVICE AND GLASSES-TYPE DEVICE INCLUDING SECONDARY BATTERY

(71) Applicant: SEMICONDUCTOR ENERGY LABORATORY CO., LTD., Atsugi (JP)

(72) Inventors: Ryota Tajima, Kanagawa (JP); Masaaki Hiroki, Kanagawa (JP); Daisuke Furumatsu, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 16/291,198

(22) Filed: Mar. 4, 2019

(65) Prior Publication Data
US 2019/0207175 A1 Jul. 4, 2019

Related U.S. Application Data

(62) Division of application No. 14/814,745, filed on Jul. 31, 2015, now Pat. No. 10,236,483.

(30) Foreign Application Priority Data

Aug. 6, 2014 (JP) .................................. 2014-160050
Oct. 27, 2014 (JP) .................................. 2014-218032

(51) Int. Cl.
*H01M 50/10* (2021.01)
*H01M 10/0583* (2010.01)
(Continued)

(52) U.S. Cl.
CPC ..... *H01M 10/0583* (2013.01); *H01M 10/0431* (2013.01); *H01M 10/0525* (2013.01);
(Continued)

(58) Field of Classification Search
CPC ..... H01M 50/20; H01M 50/463; H01M 50/10; H01M 10/0431; H01M 10/0525;
(Continued)

(56) References Cited

U.S. PATENT DOCUMENTS 4,991,951 A  2/1991 Mizuno et al.
6,599,659 B1  7/2003 Endo et al.
(Continued)

FOREIGN PATENT DOCUMENTS

CN  103682410 A  3/2014
EP  1180806 A  2/2002
(Continued)

*Primary Examiner* — Jonathan G Jelsma
*Assistant Examiner* — Omar M Kekia
(74) *Attorney, Agent, or Firm* — NIXON PEABODY LLP; Jeffrey L. Costellia

(57) ABSTRACT

A wearable device needs to have a design corresponding to complicated surfaces of human bodies. Thus, an electronic device that can fit the characteristics of each individual human body after being purchased and can be worn naturally and comfortably is provided. The electronic device includes a secondary battery which can be transformed. By using a secondary battery which can be transformed, for example, a secondary battery can be efficiently placed in a narrow and elongated space in the electronic device, and the elongated secondary battery can be bent together with the electronic device. Furthermore, the weight balance of the electronic device can be easily adjusted.

8 Claims, 17 Drawing Sheets

(51) Int. Cl.
*H01M 10/0525* (2010.01)
*H01M 10/04* (2006.01)
*H01M 50/105* (2021.01)
*H01M 50/247* (2021.01)
*H01M 50/211* (2021.01)
*H01M 50/466* (2021.01)

(52) U.S. Cl.
CPC ....... *H01M 50/105* (2021.01); *H01M 50/211* (2021.01); *H01M 50/247* (2021.01); *H01M 50/466* (2021.01)

(58) Field of Classification Search
CPC ........... H01M 10/0583; H01M 50/247; H01M 50/105; H01M 50/211; H01M 50/466
USPC ......................................................... 429/98
See application file for complete search history.

(56) References Cited

U.S. PATENT DOCUMENTS

| | | | |
|---|---|---|---|
| 8,426,069 | B2 | 4/2013 | Okazaki et al. |
| 8,926,715 | B2 | 1/2015 | Sakata et al. |
| 9,256,077 | B2 | 2/2016 | Kakinuma et al. |
| 9,786,945 | B2 | 10/2017 | Sakata et al. |
| 10,288,888 | B2 | 5/2019 | Sugihara et al. |
| 2008/0280208 | A1 | 11/2008 | Naoi et al. |
| 2011/0104550 | A1 | 5/2011 | Ahn et al. |
| 2011/0143739 | A1 | 6/2011 | Rippingale |
| 2011/0287323 | A1 | 11/2011 | Chen |
| 2013/0224562 | A1 | 8/2013 | Momo |
| 2013/0236768 | A1 | 9/2013 | Park et al. |
| 2014/0011070 | A1 | 1/2014 | Kim et al. |
| 2014/0101928 | A1 | 4/2014 | Sato et al. |
| 2015/0022957 | A1 | 1/2015 | Hiroki et al. |
| 2015/0068069 | A1 | 3/2015 | Tran et al. |
| 2015/0072204 | A1* | 3/2015 | Kwon ............... H01M 10/0436 429/94 |
| 2015/0155528 | A1 | 6/2015 | Takahashi et al. |
| 2015/0179989 | A1 | 6/2015 | Luo et al. |
| 2016/0087305 | A1 | 3/2016 | Yoneda et al. |
| 2016/0133916 | A1 | 5/2016 | Zagars et al. |

FOREIGN PATENT DOCUMENTS

| | | |
|---|---|---|
| JP | 63-066812 U | 5/1988 |
| JP | 02-266322 A | 10/1990 |
| JP | 2001-051240 A | 2/2001 |
| JP | 2002-063938 A | 2/2002 |
| JP | 2002-373649 A | 12/2002 |
| JP | 2008-282739 A | 11/2008 |
| JP | 4183342 | 11/2008 |
| JP | 2009-140772 A | 6/2009 |
| JP | 2010-199281 A | 9/2010 |
| JP | 2013-149477 A | 8/2013 |
| JP | 2013-191485 A | 9/2013 |
| JP | 2013-211262 A | 10/2013 |
| JP | 2013-243514 A | 12/2013 |
| WO | WO-2006/120959 | 11/2006 |
| WO | WO-2007/132994 | 11/2007 |
| WO | WO-2012/001891 | 1/2012 |

\* cited by examiner

ELECTRONIC DEVICE AND GLASSES-TYPE DEVICE INCLUDING SECONDARY BATTERY

BACKGROUND OF THE INVENTION

1. Field of the Invention

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to an electronic device and its operating system.

Note that electronic devices in this specification generally mean devices including secondary batteries, and electro-optical devices including secondary batteries, information terminal devices including secondary batteries, and the like are all electronic devices.

2. Description of the Related Art

Portable electronic devices and wearable electronic devices have been actively developed. For example, a thin portable electronic book is disclosed in Patent Document 1.

Such portable electronic devices and wearable electronic devices operate mainly using secondary batteries as power sources. Portable electronic devices need to withstand the use for a long period and thus may incorporate high-capacity secondary batteries. Since high-capacity secondary batteries are large in size and heavy, their incorporation in electronic devices increases the size and weight of the electronic devices. Thus, small or thin high-capacity secondary batteries that can be incorporated in portable electronic devices are under development.

The sheet-like power storage device which can be curved or bent in at least one axis direction is disclosed in Patent Document 1.

REFERENCE

Patent Document

[Patent Document 1] Japanese Published Patent Application No. 2013-211262

SUMMARY OF THE INVENTION

Electronic devices having a variety of designs have been proposed by the manufacturers and have become diversified. In a small electronic device having a complex exterior shape, a space to incorporate or include a secondary battery is limited. When an existing coin-type lithium-ion secondary battery is provided in the limited space, the place in which the secondary battery is provided and the number of secondary batteries might be limited. Furthermore, providing a plurality of small coin-type lithium-ion secondary batteries is not efficient because the connection between the secondary batteries becomes complicated and wasted spaces are formed.

In this manner, the manufacturers need to make the product design and the like in consideration of the space in which the secondary battery is provided; thus, the product design is limited in accordance with the shape and position of the secondary battery.

However, in the case of a wearable device, a design corresponding to complicated surfaces of human bodies is needed. Specifically, in the case of a device worn on an arm, it is desirable that the device have a design having a surface that fits a curved surface of the arm and the device can be transformed. Furthermore, it is also important for the device to have weight balance with which the device can be comfortably used.

In particular, the wearable device preferably fits the characteristics of each individual human body after being purchased and is preferably worn naturally and comfortably.

Specifically, the distance between human eyes, i.e., the distance between pupils, has an individual difference from approximately 50 mm to 80 mm. Furthermore, the position of a nose and the positions of ears also have an individual difference. In the case of a glasses-type device, when a device which does not fit the body is worn, problems may arise in that, for example, it is hard to see for the user, the device slips when the user moves, and a mark is left on the nose due to the weight placed on the nose.

Thus, an electronic device having a novel structure is provided. Specifically, an electronic device having a novel structure that can be changed in appearance in various ways is provided.

An object of one embodiment of the present invention is to provide a novel power storage device, a novel secondary battery, or the like. Note that the descriptions of these objects do not disturb the existence of other objects. In one embodiment of the present invention, there is no need to achieve all the objects. Other objects will be apparent from and can be derived from the description of the specification, the drawings, the claims, and the like.

Thus, one embodiment of the present invention is an electronic device including a secondary battery which can be transformed. By using a secondary battery which can be transformed, for example, a secondary battery can be efficiently placed in a narrow and elongated space in an electronic device, and the elongated secondary battery can be bent together with the electronic device. Furthermore, the weight balance of the electronic device can be easily adjusted.

Thus, the elongated secondary battery is placed in a portion that is positioned along each side of a user's head when the device is worn (also referred to as temples) to bend a part of the battery.

An electronic device including a secondary battery which can be transformed can be provided. Furthermore, a secondary battery can be efficiently placed in a space in an electronic device. Furthermore, a bendable electronic device can be provided.

Furthermore, a wearable device which can fit characteristics of each individual human body and can be worn naturally and comfortably can be provided. Furthermore, an electronic device having weight balance with which the device can be comfortably used can be provided.

Furthermore, a novel electronic device or a novel power storage device can be provided. Note that the description of these effects does not disturb the existence of other effects. One embodiment of the present invention does not necessarily have all the effects listed above. Other effects will be apparent from and can be derived from the description of the specification, the drawings, the claims, and the like.

DETAILED DESCRIPTION OF THE INVENTION

Figure 1A:
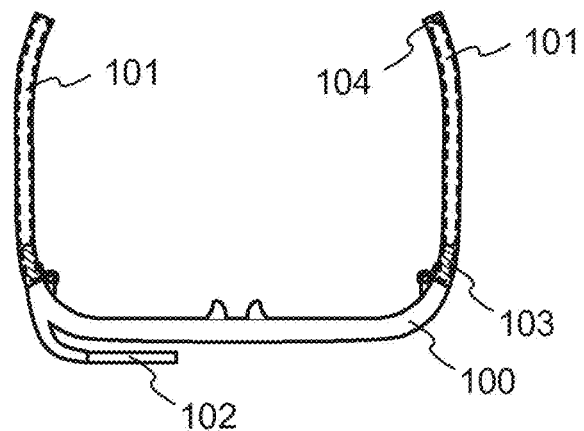
FIGS. 1A to 1C are top views and a perspective view illustrating embodiments of the present invention.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments and the examples.

The term "electrically connected" includes the case where components are connected through an "object having any electric function". There is no particular limitation on the "object having any electric function" as long as electric signals can be transmitted and received between the components connected through the object.

The position, size, range, or the like of each component illustrated in drawings is not accurately represented in some cases for easy understanding. Therefore, the disclosed invention is not necessarily limited to the position, size, range, or the like disclosed in the drawings and the like.

The ordinal number such as "first", "second", and "third" are used to avoid confusion among components.

Embodiment 1

In this embodiment, examples of an electronic device of one embodiment of the present invention are described with reference to FIGS. 1A to 1C.

Figure 1B:
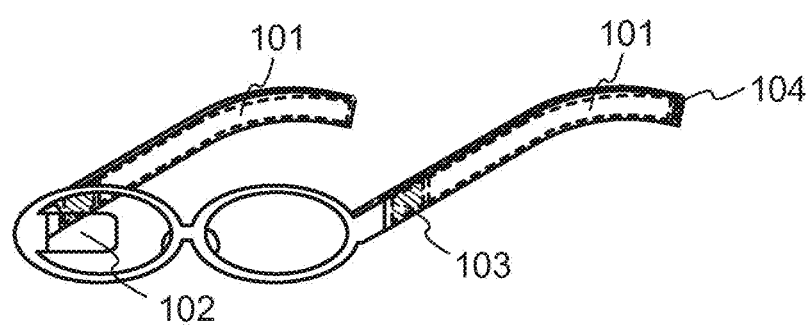

FIG. 1A is a top view of a glasses-type device 100 of one embodiment of the present invention, and FIG. 1B is a perspective view of the glasses-type device 100.

The glasses-type device 100 includes a portion that is positioned along each side of the head of the user when the device is worn (hereinafter referred to as temples), and a secondary battery 101 is provided in each of the right and left temples.

As the secondary battery 101, a secondary battery that can be transformed is used. For example, in the case where the temples are formed using a flexible member or the like, the shapes of the temples can be changed. Thus, a user who purchased the glasses-type device 100 can change the shapes of the temples after purchasing to fit the shape of the glasses-type device 100 to the characteristics of each user such as the distance between the eyes and the positions of the nose and the ears. As a result, the user can wear the glasses-type device 100 naturally and comfortably.

If many components including the secondary battery are positioned in the front portion of the glasses-type device 100, for example, the weight balance of the glasses-type device 100 may be lost. Then, the secondary battery 101 is positioned in the temple, whereby the glasses-type device 100 can have a weight well-balanced so as to be comfortably used can be provided.

In addition, the glasses-type device 100 may include a terminal portion 104. The secondary battery 101 can be charged through the terminal portion 104. Furthermore, the secondary batteries 101 are preferably electrically connected to each other. When the secondary batteries 101 are electrically connected to each other, the two secondary batteries 101 can be charged through the one terminal portion 104.

In addition, the glasses-type device 100 may include a display portion 102. The display portion 102 may have a light-emitting function. Examples of the display portion 102 having a light-emitting function are a display device using an LED and a display device using an organic EL. Furthermore, the glasses-type device 100 may include a control portion 103. The control portion 103 can control charge and discharge of the secondary battery 101 and can generate image data which is displayed on the display portion 102. Moreover, if a chip having a wireless communication function is included in the control portion 103, data can be transmitted to and received from the outside.

Figure 1C:
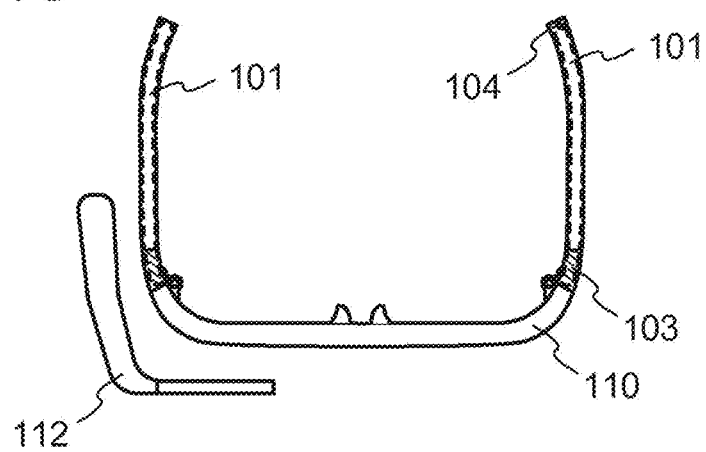

Alternatively, as illustrated in FIG. 1C, a glasses-type device 110 that is not provided with the display portion 102 may be provided. An external display portion 112 may be attached to the glasses-type device 110. Thus, the distance between the eyes of the user and the display portion 112 can be easily adjusted.

Furthermore, between the glasses-type device 110 and the external display portion 112, wireless communication and wireless power feeding may be performed.

Embodiment 2

In this embodiment, examples of the secondary battery 101 that can be used in one embodiment of the present invention are described with reference to FIGS. 2A to 2D, FIGS. 3A to 3C, FIGS. 5A to 5D, FIGS. 6A to 6D, and FIGS. 7A to 7C. Note that in the drawings, parts of components are selectively illustrated for simplicity.

Figure 2A:
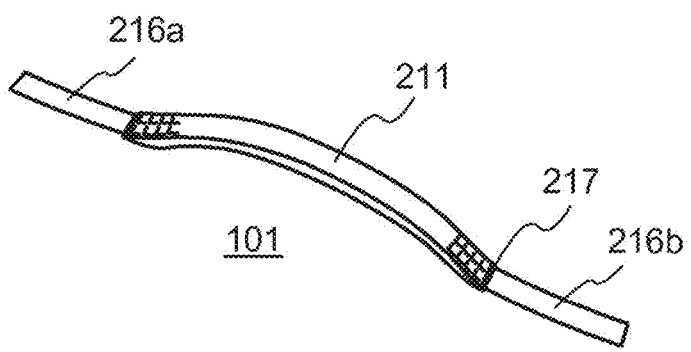
FIGS. 2A to 2D are a cross-sectional view, a top view, and perspective views illustrating a secondary battery which can be used in one embodiment of the present invention.
Figure 2B:
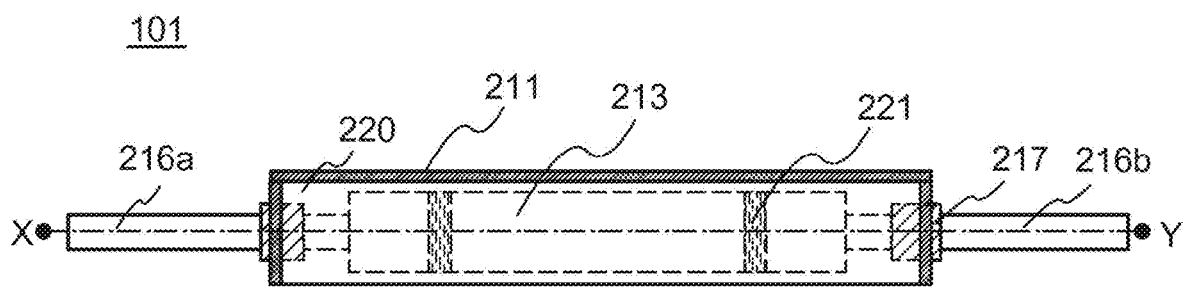
Figure 2C:
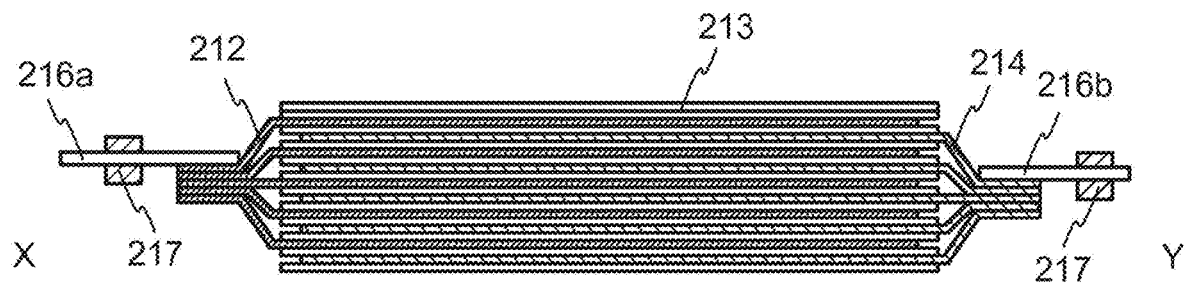
Figure 2D:
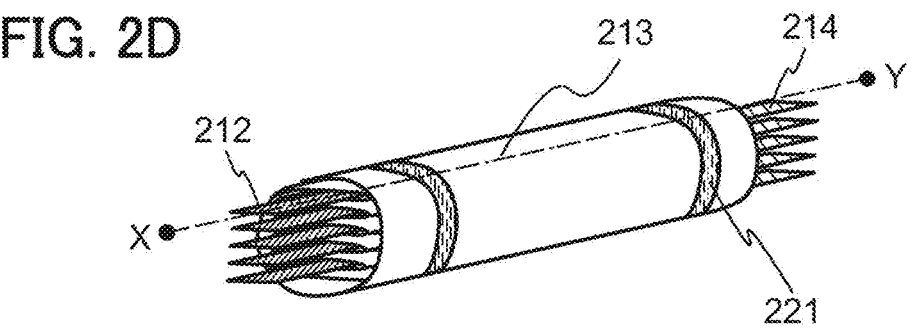

First, the structure of the secondary battery 101 is described with reference to FIGS. 2A to 2D. FIG. 2A is an external perspective view of the secondary battery 101. Furthermore, FIGS. 2B, 2C, and 2D schematically illustrate the structure of the secondary battery 101 for description. FIG. 2B is a top view of the secondary battery 101. FIG. 2C is a cross-sectional view of the secondary battery 101 taken along the dashed-dotted line X-Y in FIG. 2B, and FIG. 2D is a perspective view of the secondary battery 101. In FIGS. 2C and 2D, parts of the components are selectively illustrated.

As illustrated in FIGS. 2A, 2B, and 2C, the secondary battery 101 includes a plurality of positive electrode current collectors 212, a plurality of negative electrode current collectors 214, a separator 213, an exterior body 211, and an electrolyte solution 220 in a region surrounded by the exterior body 211. In addition, a lead electrode 216a electrically connected to the positive electrode current collectors 212 and a lead electrode 216b electrically connected to the negative electrode current collectors 214 are included. Note that the lead electrode 216a and the lead electrode 216b each are partly covered with a sealant 217.

Furthermore, as illustrated in FIG. 2A, the secondary battery 101 can have a curved structure. That is, the plurality of positive electrode current collectors 212, the plurality of negative electrode current collectors 214, the separator 213, and the exterior body 211 included in the secondary battery 101 each can have a curved portion. When such a secondary battery 101 that can be transformed is included in an electronic device, the electronic device can be transformed.

In FIG. 2D, the plurality of positive electrode current collectors 212, the plurality of negative electrode current collectors 214, and the separator 213 are selectively illustrated. As illustrated in FIG. 2D, in the secondary battery 101, the plurality of positive electrode current collectors 212 and the plurality of negative electrode current collectors 214 are covered with the separator 213 and bound by binding materials 221.

That is, one separator 213 has regions sandwiched between the plurality of positive electrode current collectors 212 and the plurality of negative electrode current collectors 214 and a region positioned to cover the plurality of positive electrode current collectors 212 and the plurality of negative electrode current collectors 214.

In other words, the separator 213 included in the secondary battery 101 is a single separator which is partly folded. In the folded parts of the separator 213, the plurality of positive electrode current collectors 212 and the plurality of negative electrode current collectors 214 are provided.

Note that although the structure in which the plurality of positive electrode current collectors 212 and the plurality of negative electrode current collectors 214 are bound by the binding materials 221 is shown in FIG. 2D, the structure of the secondary battery is not limited thereto. The plurality of positive electrode current collectors 212 and the plurality of negative electrode current collectors 214 may be bound without using the binding material. For example, parts of the separator 213 can be thermally welded depending on the material of the separator 213. Thus, in a region where the separator 213 is positioned to cover the current collectors, portions of the separator 213 overlapping with each other are thermally welded, also whereby the plurality of positive electrode current collectors 212 and the plurality of negative electrode current collectors 214 can be bound. In the case of thermally welding the separator, the material of the separator is preferably polypropylene, polyethylene, or the like.

Figure 3A:
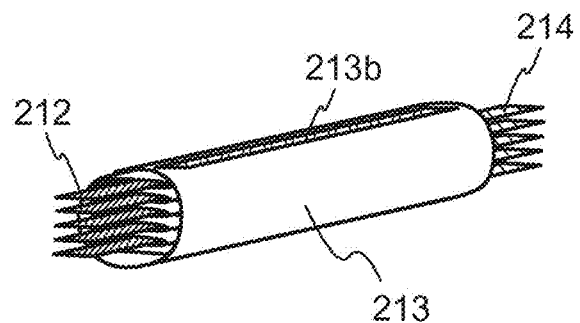
FIGS. 3A to 3C are perspective views illustrating secondary batteries which can be used in one embodiment of the present invention and a method for manufacturing the secondary battery.
Figure 3B:
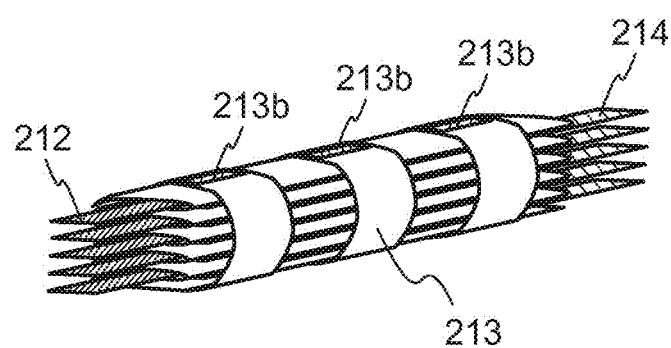

FIGS. 3A and 3B show examples of the secondary battery 101 in which the plurality of positive electrode current collectors 212 and the plurality of negative electrode current collectors 214 are bound by thermally welding the separator. Note that in FIGS. 3A and 3B, the plurality of positive electrode current collectors 212, the plurality of negative electrode current collectors 214, and the separator 213 are selectively illustrated. FIG. 3A illustrates the secondary battery 101 in which a region 213b of the separator 213 is thermally welded.

FIG. 3B illustrates the secondary battery 101 in which a region of the separator 213 that covers the plurality of positive electrode current collectors 212 and the plurality of negative electrode current collectors 214 is partly removed and the regions 213b of the separator 213 are thermally welded. When the region of the separator 213 that is positioned to cover the plurality of positive electrode current collectors 212 and the plurality of negative electrode current collectors 214 is partly removed, gaps can be formed in a region used for binding in the separator 213. Thus, a gas generated by decomposition of an electrolytic solution due to charge and discharge hardly remains between the plurality of positive electrode current collectors 212 and the plurality of negative electrode current collectors 214. Therefore, uneven battery reaction of the secondary battery 101 hardly occurs, an increase in the internal resistance can be suppressed, and the capacity of the secondary battery 101 can be increased.

Although not illustrated in FIGS. 2A to 2D and FIGS. 3A to 3C for simplicity, a positive electrode active material layer is provided on part of one or both surfaces of the positive electrode current collector 212. The positive electrode active material layer includes at least a positive electrode active material. Furthermore, a negative electrode active material layer is provided on part of one or both surfaces of the negative electrode current collector 214. The negative electrode active material layer includes at least a negative electrode active material. Note that regions in which the positive electrode active material layer and the negative electrode active material layer are provided overlap with the separator 213.

Although a structure in which the positive electrode current collectors 212 and the negative electrode current collectors 214 are alternately stacked is shown in FIGS. 2A to 2D and FIGS. 3A to 3C, one embodiment of the present invention is not limited thereto. An appropriate structure varies depending on whether the active material is provided on both surfaces or one surface of the current collector.

Figure 4A:
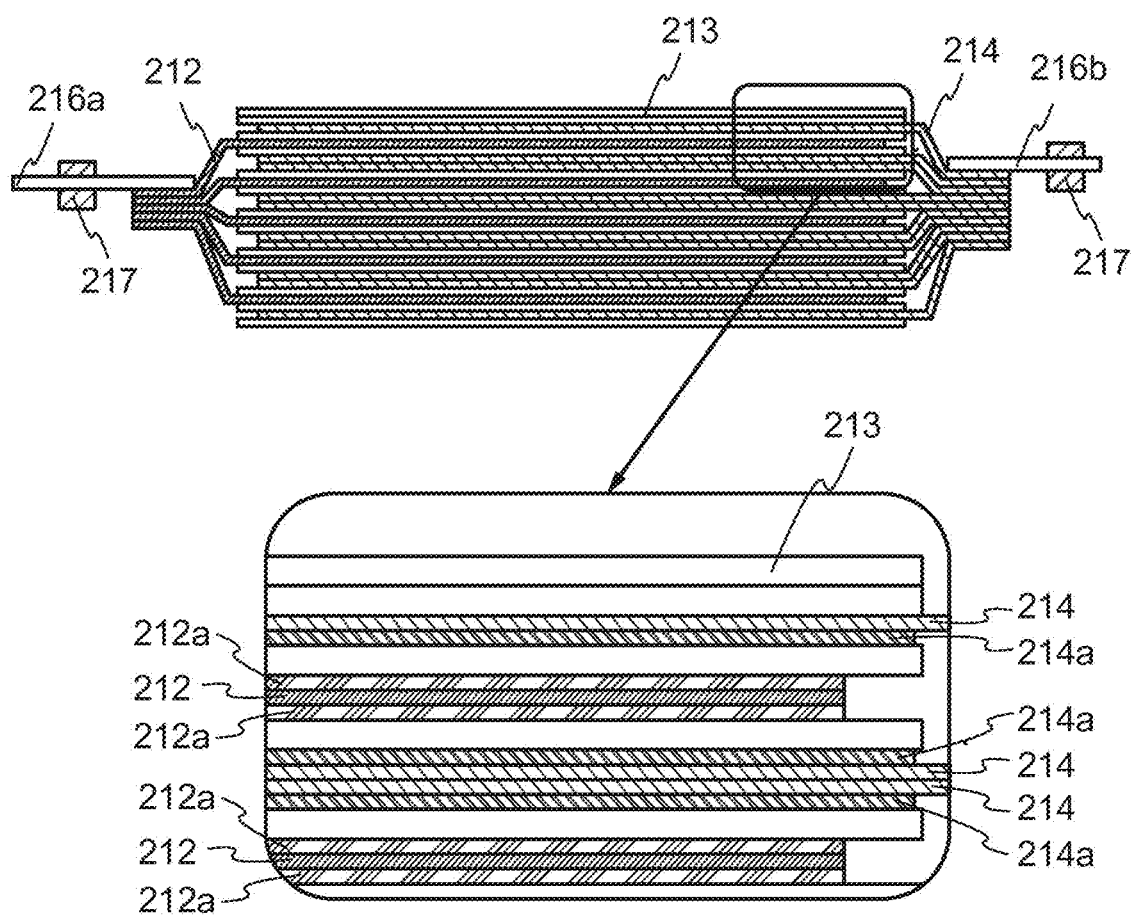
FIGS. 4A and 4B are cross-sectional views illustrating a secondary battery which can be used in one embodiment of the present invention.
Figure 4B:
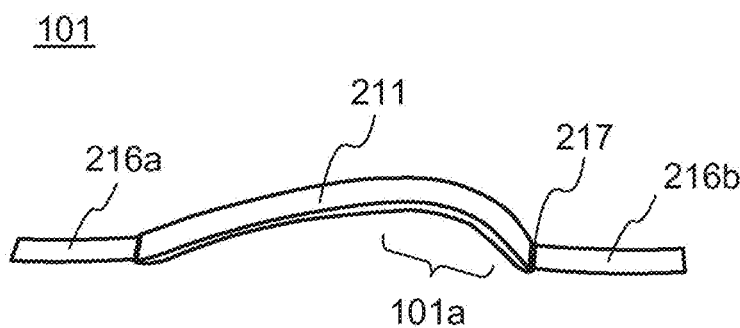

FIGS. 4A and 4B show another example of the structure in which the positive electrode current collectors 212 and the negative electrode current collectors 214 are stacked.

FIG. 4A illustrates a structure in which five positive electrode current collectors 212 and ten negative electrode current collectors 214 are stacked. A positive electrode active material layer 212A is formed on both surfaces of the positive electrode current collector 212 and a negative electrode active material layer 214A is formed on one surface of the negative electrode current collector 214. As illustrated in an enlarged view, the positive electrode active material layer 212A and the negative electrode active material layer 214A are stacked to face each other with the separator 213 provided therebetween. Furthermore, the negative electrode current collectors 214 are stacked so that the surfaces on which the negative electrode active material layers are not provided are in contact with each other.

The contact surface between the surfaces of the negative electrode current collectors 214 on which the negative electrode active material layers are not provided has lower friction than the contact surface between the active material layer and the separator. Thus, stress caused by the difference between the inner diameter and outer diameter of a curved portion, which is generated when the secondary battery 101 is curved in a later step, can be easily relieved. Therefore, the reliability of the secondary battery 101 can be improved.

The structure in which the contact surface between the surfaces of the negative electrode current collectors 214 on which the negative electrode active material layers are not provided as illustrated in FIG. 4A is particularly effective in the case where a highly curved portion 101a of the secondary battery 101 is close to the lead electrode 216b electrically connected to the negative electrode current collectors 214 as illustrated in FIG. 4B. Note that in this specification and the like, for example, "a highly curved portion is close to the lead electrode electrically connected to the negative electrode current collectors" means that the most highly curved portion in the secondary battery is closer to the lead electrode to which the negative electrode current collectors are electrically connected than the midpoint of the long side of the secondary battery.

In the case of the structure of FIG. 4B, the positive electrode current collectors 212 are curved in a portion that is apart from a portion in which the positive electrode current collectors 212 are electrically connected to each other; thus, a load such as stress applied to the positive electrode current collectors 212 is relatively small. On the other hand, the negative electrode current collectors 214 are curved in a portion that is close to a portion in which the negative electrode current collectors 214 are electrically connected to each other, thus, stress applied to the negative electrode current collectors 214 becomes large. Therefore, it is particularly effective for easily relieving stress to form the contact surface having lower friction between the surfaces of the negative electrode current collectors 214 on which the negative electrode active material layers are not provided.

Although the case where the highly curved portion 101a is close to the lead electrode 216b electrically connected to the negative electrode current collectors 214 is shown in FIGS. 4A and 4B, one embodiment of the present invention is not limited thereto. In the case where the highly curved portion 101a is close to the lead electrode 216a electrically connected to the positive electrode current collectors 212, it is preferable that positive electrode current collectors each of which is provided with a positive electrode active material layer on one surface be used and the contact surface between the surfaces of the positive electrode current collectors on which the positive electrode active material layers are not provided be formed.

Alternatively, in the case where the highly curved portions 101a are close to both ends of the secondary battery 101, the whole secondary battery 101 is highly curved, and the like, current collectors each of which is provided with an active material on one surface are preferably used as the positive electrode current collectors and the negative electrode current collectors. Such a structure increases contact surfaces having low friction between the surfaces of the negative electrode current collectors on which the negative electrode active material layers are not provided and between the surfaces of the positive electrode current collectors on which the positive electrode active material layers are not provided, whereby stress applied when the secondary battery is curved can be more easily relieved.

Next, materials that can be used for the positive electrode current collector 212, the negative electrode current collector 214, the positive electrode active material, the separator 213, the electrolyte solution 220, the negative electrode active material, and the exterior body 211, which are included in the secondary battery 101, are described.

There is no particular limitation on the materials used for the positive electrode current collector 212 and the negative electrode current collector 214 as long as it has high conductivity without causing a significant chemical change in the secondary battery. For example, the current collector can be formed using a metal such as gold, platinum, iron, nickel, copper, aluminum, titanium, tantalum, or manganese, or an alloy thereof (e.g., stainless steel). Furthermore, coating with carbon, nickel, titanium, or the like may be performed. Silicon, neodymium, scandium, molybdenum, or the like may be added to improve heat resistance. The current collector can each have any of various shapes including a foil-like shape, a sheet-like shape, a plate-like shape, a net-like shape, a cylindrical shape, a coil shape, a punching-metal shape, an expanded-metal shape, a porous shape, and a shape of non-woven fabric as appropriate. The current collector may be formed to have micro irregularities on the surface thereof in order to enhance adhesion to the active material. The current collector preferably has a thickness of more than or equal to 5 μm and less than or equal to 30 μm.

For the positive electrode active material and the negative electrode active material, a material capable of reversible reaction with carrier ions such as lithium ions can be used. The average diameter or diameter distribution of active material particles can be controlled by crushing, granulation, and classification by an appropriate means.

Examples of positive electrode active materials that can be used for the positive electrode active material layer include a composite oxide with an olivine structure, a composite oxide with a layered rock-salt structure, and a composite oxide with a spinel structure. For example, a compound such as $LiFeO_2$, $LiCoO_2$, $LiNiO_2$, $LiMn_2O_4$, $V_2O_5$, $Cr_2O_5$, or $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFeNibPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hM-n_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s++u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as NaFeF$_3$ and FeF$_3$, a metal chalcogenide (a sulfide, a selenide, or a telluride) such as TiS$_2$ and MoS$_2$, an oxide with an inverse spinel structure such as LiMVO$_4$, a vanadium oxide (V$_2$O$_5$, V$_6$O$_{13}$, LiV$_3$O$_8$, or the like), a manganese oxide, an organic sulfur compound, or the like can be used as the positive electrode active material.

In the case where carrier ions are alkaline-earth metal ions or alkali metal ions other than lithium ions, the positive electrode active material may contain, instead of lithium in the above lithium compound or the like, an alkali metal (e.g., sodium or potassium) or an alkaline-earth metal (e.g., calcium, strontium, barium, beryllium, or magnesium).

The positive electrode active material layer may further include a binder for increasing adhesion of active materials, a conductive additive for increasing the conductivity of the positive electrode active material layer, and the like in addition to the above-described positive electrode active materials.

As the separator 213, an insulator such as cellulose (paper), glass fiber, polyethylene with pores, polypropylene with pores, or polyphenylene sulfide with pores can be used.

As an electrolyte in the electrolyte solution 220, a material having carrier ion mobility and containing lithium ions serving as carrier ions is used. Typical examples of the electrolyte are lithium salts such as LiPF$_6$, LiClO$_4$, LiAsF$_6$, LiBF$_4$, LiCF$_3$SO$_3$, Li(CF$_3$SO$_2$)$_2$N, Li(C$_2$F$_5$SO$_2$)$_2$N, and LiN(FSO$_2$)$_2$. One of these electrolytes may be used alone, or two or more of them may be used in an appropriate combination and in an appropriate ratio.

As a solvent of the electrolyte solution 220, a material with the carrier ion mobility is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), ethylmethyl carbonate (EMC). γ-butyrolactone, acetonitrile, dimethoxyethane, tetrahydrofuran, and the like, and one or more of these materials can be used. When a gelled high-molecular material is used as the solvent of the electrolytic solution or a high-molecular material for gelling is added to the electrolytic solution, safety against liquid leakage and the like is improved. Furthermore, the secondary battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like. Alternatively, the use of one or more kinds of ionic liquids (room temperature molten salts) which have features of non-flammability and non-volatility as a solvent of the electrolyte solution can prevent the secondary battery from exploding or catching fire even when the secondary battery internally shorts out or the internal temperature increases owing to overcharging or the like. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium (PP$_{13}$) cation.

Instead of the electrolyte solution 220, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the secondary battery can be entirely solidified; therefore, there is no possibility of liquid leakage and thus the safety of the secondary battery is dramatically increased.

A material with which lithium can be dissolved and precipitated or a material which can reversibly react with lithium ions can be used for a negative electrode active material used in the negative electrode active material layer, for example, a lithium metal, a carbon-based material, an alloy-based material, or the like can be used.

The lithium metal is preferable because of its low redox potential (−3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

As the negative electrode active material, other than the above carbon materials, an alloy-based material or oxide which enables a charge-discharge reaction by an alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, and the like can be used as the alloy-based material. Such elements have higher capacity than carbon. In particular, silicon has a significantly high theoretical capacity of 4200 mAh/g. For this reason, silicon is preferably used as the negative electrode active material. Examples of the alloy-based material using such elements include Mg$_2$Si, Mg$_2$Ge, Mg$_2$Sn, SnS$_2$, V$_2$Sn$_3$, FeSn$_2$, CoSn$_2$, Ni$_3$Sn$_2$, Cu$_6$Sn$_5$, Ag$_3$Sn, Ag$_3$Sb, Ni$_2$MnSb, CeSb$_3$, LaSn$_3$, La$_3$Co$_2$Sn$_7$, CoSb$_3$, InSb, SbSn, and the like.

Alternatively, for the oxide, for example, SiO, SnO, or SnO$_2$, can be used. Note that SiO refers to the powder of a silicon oxide including a silicon-rich portion and can also be referred to as SiO$_y$ (2>y>0). Examples of SiO include a material containing one or more of Si$_2$O$_3$, Si$_3$O$_4$, and Si$_2$O and a mixture of Si powder and silicon dioxide (SiO$_2$). Furthermore, SiO may contain another element (e.g., carbon, nitrogen, iron, aluminum, copper, titanium, calcium, and manganese). In other words, SiO refers to a material containing two or more of single crystal silicon, amorphous silicon, polycrystal silicon, Si$_2$O$_3$, Si$_3$O$_4$, Si$_2$O, and SiO$_2$ and is a colored material. Thus, SiO can be distinguished from SiO$_x$ (x is 2 or more), which is clear and colorless or white. Note that in the case where a secondary battery is fabricated using SiO as a material thereof and the SiO is oxidized because of repeated charge and discharge cycles, SiO is changed into SiO$_2$ in some cases.

Alternatively, for the negative electrode active material, an oxide such as titanium dioxide (TiO$_2$), lithium titanium oxide (Li$_4$Ti$_5$O$_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer may further include a binder for increasing adhesion of active materials, a conductive additive for increasing the conductivity of the negative electrode active material layer, and the like in addition to the above negative electrode active material.

In the secondary battery of this embodiment, for example, the separator 213 has a thickness of approximately 15 μm to 30 μm, the positive electrode current collector has a thickness of approximately 10 μm to 40 μm, the positive electrode active material layer has a thickness of approximately 50 μm to 100 μm, the negative electrode active material layer has a thickness of approximately 50 μm to 100 μm, and the negative electrode current collector has a thickness of approximately 5 μm to 40 μm.

As the exterior body 211, a film made of a flexible material is used. As the film, a stack in which a resin layer is provided on one of or both surfaces of a metal film and the resin layer on one surface functions as an adhesive layer (also referred to as a heat-seal layer) is preferably used. As the adhesive layer, a heat-seal resin film containing polypropylene, polyethylene, or the like can be used. The film used in this embodiment is a metal film in which a nylon resin is provided on one surface of aluminum foil and a stack including an acid-proof polypropylene film and a polypropylene film is provided on the other surface.

Furthermore, the film used as the exterior body 211 may be embossed. By using the embossed exterior body 211, the secondary battery 101 can be bent more easily.

Next, a method for manufacturing the secondary battery 101 is described with reference to FIG. 3C, FIGS. 5A to 5D, FIGS. 6A to 6D, and FIGS. 7A to 7C. First, the separator 213, the positive electrode current collector 212, and the negative electrode current collector 214 are prepared. Then, a positive electrode active material layer is provided on one surface or both surfaces of the positive electrode current collector 212. Furthermore, a negative electrode active material layer is provided on one surface or both surfaces of the negative electrode current collector 214.

When the positive electrode current collector 212 and the negative electrode current collector 214 each of which is provided with an active material layer on one surface are used, contact surfaces having low friction between the surfaces of the positive electrode current collectors 212 on which a positive electrode active material is not provided and between the surfaces of the negative electrode current collectors 214 on which a negative electrode active material is not provided can be formed depending on with the arrangement of the positive electrode current collectors 212 and the negative electrode current collectors 214. This is preferable because stress caused by the difference between the inner diameter and outer diameter of a curved portion, which is generated when the secondary battery 101 is curved in a later step, can be easily relieved. Alternatively, when the positive electrode current collector 212 and the negative electrode current collector 214 each of which is provided with active material layers on both surfaces are used, the capacity per unit volume of the secondary battery 101 can be increased.

Figure 5A:
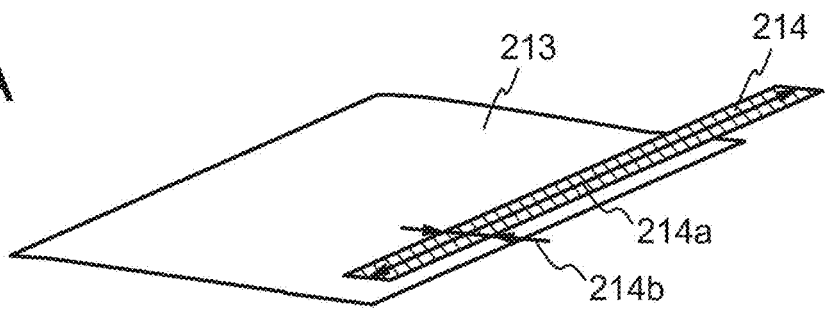
FIGS. 5A to 5D are perspective views illustrating a method for manufacturing a secondary battery which can be used in one embodiment of the present invention.
Figure 5B:
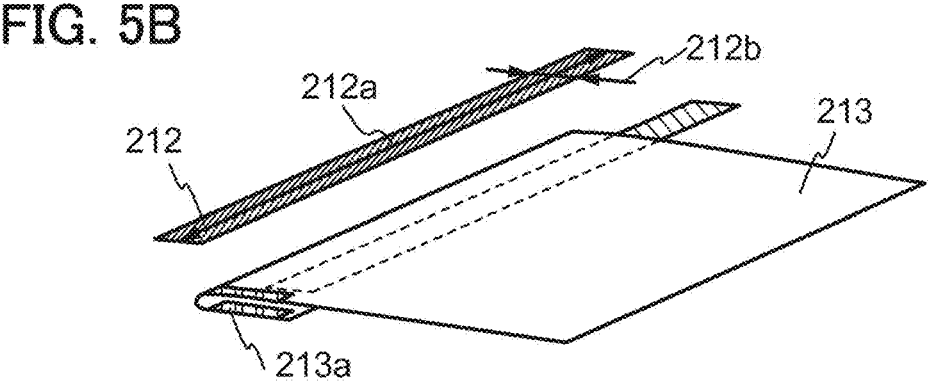

Furthermore, the positive electrode current collector 212 and the negative electrode current collector 214 are preferably formed into elongated shapes. That is, a length 212a of the long side of the positive electrode current collector 212 in FIG. 5B is preferably 10 times or more, further preferably 20 times or more a length 212b of the short side of the positive electrode current collector 212. Alternatively, it is preferable that the length 212a of the long side of the positive electrode current collector 212 be 60 mm or more and the length 212b of the short side be 6 mm or less. Similarly, a length 214a of the long side of the negative electrode current collector 214 in FIG. 5A is preferably 10 times or more, further preferably 20 times or more a length 214b of the short side of the negative electrode current collector 214. Alternatively, it is preferable that the length 214a of the long side of the negative electrode current collector 214 be 60 mm or more and the length 214b of the short side be 6 mm or less. The positive electrode current collector 212 and the negative electrode current collector 214 each have an elongated shape as described above, whereby the secondary battery 101 having an elongated shape can be fabricated. Therefore, the secondary battery can be efficiently placed in a space in an electronic device.

Note that in this specification and the like, the long sides and the short sides of the positive electrode current collector 212 and the negative electrode current collector 214 are measured along the curves of the positive electrode current collector 212 and the negative electrode current collector 214.

Furthermore, when the active material layers are provided on the metal foil and then the positive electrode current collector 212 and the negative electrode current collector 214 are cut out by laser processing, the positive electrode current collector 212 and the negative electrode current collector 214 can be formed in correct shapes with a high yield.

Next, as illustrated in FIG. 5A, the negative electrode current collector 214 overlaps the separator 213. Then, the separator 213 is folded to overlap the negative electrode current collector 214. Next, as illustrated in FIG. 5B, the positive electrode current collector 212 overlaps the separator 213. Then, the separator 213 is folded to overlap the positive electrode current collector 212. Note that in the case of using a current collector whose one surface is provided with an active material layer, the positive electrode active material layer of the positive electrode current collector 212 and the negative electrode active material layer of the negative electrode current collector 214 overlap to face each other with the separator provided therebetween.

In the case where the separator 213 is formed using a material that can be thermally welded, such as polypropylene, a region where the separator 213 overlap with itself is thermally welded and then another current collector overlaps the separator 213, whereby the slippage of the current collector in the fabrication process can be suppressed. Specifically, a region which does not overlap with the negative electrode current collector 214 or the positive electrode current collector 212 and in which the separator 213 overlaps with itself, e.g., a region 213a, is preferably thermally welded.

Furthermore, when the secondary battery 101 is curved, the current collector may slip inside the secondary battery because the curvature of the inner surface of the curved portion is different from that of the outer surface of the curved portion. However, a region where the separator 213 overlaps with itself as described above. e.g., the region 213a, is thermally welded, whereby, even when the current collector slips, an internal short circuit because of the contact between the positive electrode current collector and the negative electrode current collector can be prevented.

Figure 5C:
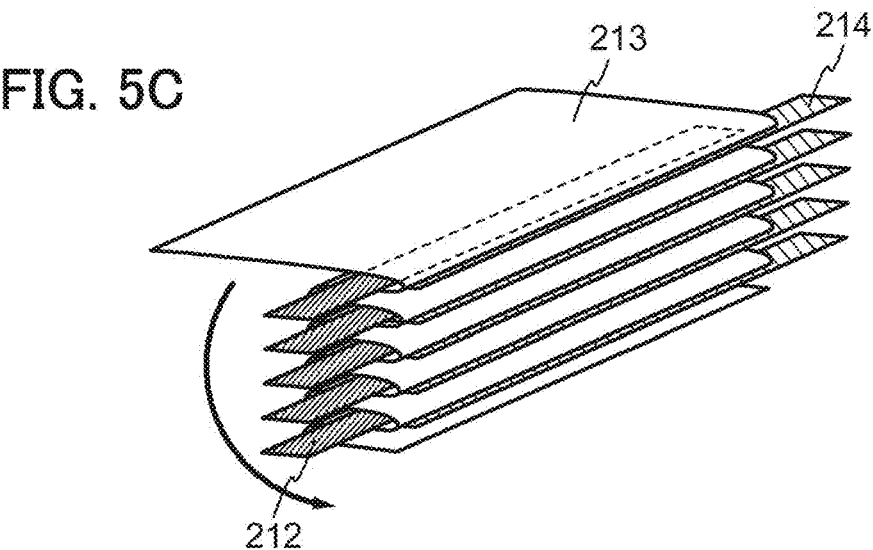

By repeating the above steps, the positive electrode current collectors 212 and the negative electrode current collectors 214 can overlap with each other with the separator 213 provided therebetween as illustrated in FIG. 5C.

Note that the plurality of positive electrode current collectors 212 and the plurality of negative electrode current collectors 214 may be placed to be alternately sandwiched between the spaces of the separator 213 that is repeatedly folded in advance.

Figure 5D:
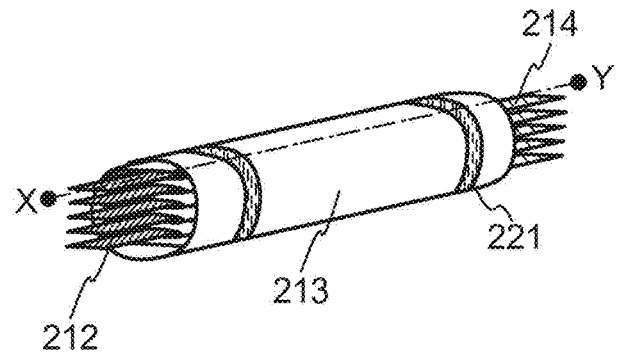

Next, as illustrated in FIGS. 5C and 5D, the plurality of positive electrode current collectors 212 and the plurality of negative electrode current collectors 214 are covered with the separator 213 and bound by the binding materials 221.

As the binding material 221, a polyimide film, polypropylene, polyethylene, or the like to which an adhesive is applied can be used.

Note that in the case where the secondary battery 101 illustrated in FIG. 3A is fabricated, a region where the separator 213 overlaps with itself, e.g., the region 213b, is thermally welded, and the plurality of positive electrode current collectors 212 and the plurality of negative electrode current collectors 214 are covered with the separator 213 to be bound.

Figure 3C:
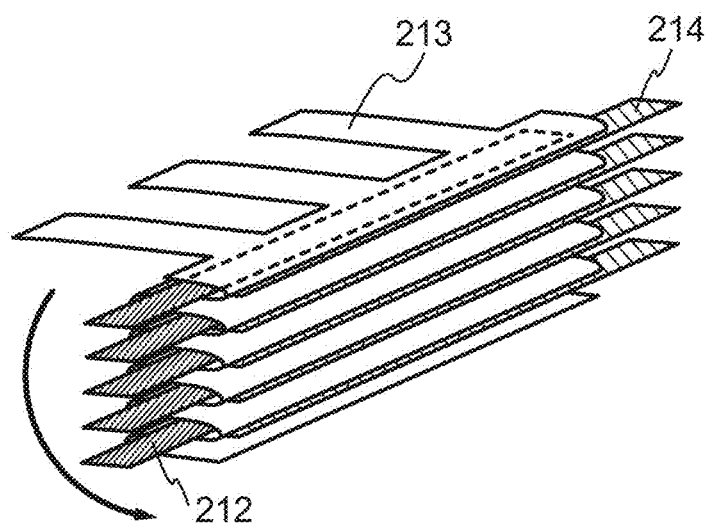

Furthermore, in the case where the secondary battery 101 illustrated in FIG. 3B is fabricated, the plurality of positive electrode current collectors 212 and the plurality of negative electrode current collectors 214 overlap with each other to be sandwiched between the separator 213 from which a region covering the plurality of positive electrode current collectors 212 and the plurality of negative electrode current collectors 214 is partly removed in advance as illustrated in FIG. 3C.

After that, a region where the separator 213 overlaps with itself, e.g., the region 213b, is thermally welded, and the plurality of positive electrode current collectors 212 and the plurality of negative electrode current collectors 214 are covered with the separator 213 part of which is removed and are bound.

Figure 6A:
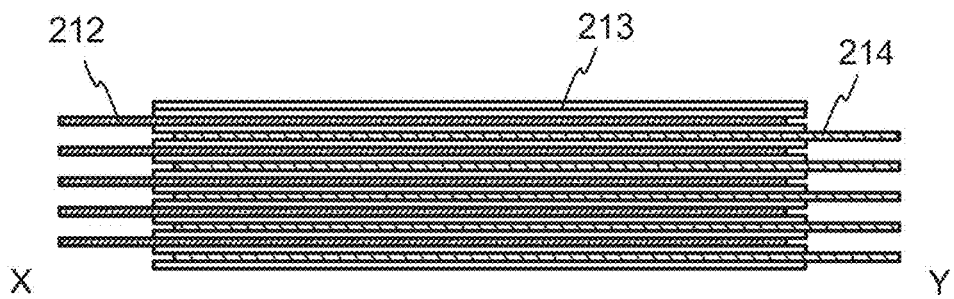
FIGS. 6A to 6D are cross-sectional views and top views illustrating a method for manufacturing a secondary battery which can be used in one embodiment of the present invention.

FIG. 6A is a cross-sectional view of the secondary battery 101 taken along the dashed-dotted line X-Y in FIG. 5D.

Figure 6B:
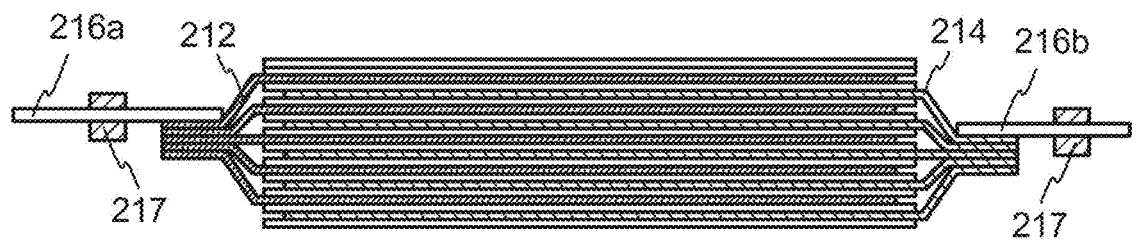

Next, as illustrated in FIG. 6B, the plurality of positive electrode current collectors 212 are electrically connected to the lead electrode 216a. Furthermore, the plurality of negative electrode current collectors 214 are electrically connected to the lead electrode 216b. The electrical connection can be made by ultrasonic welding. Note that, as illustrated in FIG. 6B, one end portion of the plurality of positive electrode current collectors 212 having elongated shapes and one end portion of the plurality of negative electrode current collectors 214 having elongated shapes each are preferably welded. In other words, the plurality of positive electrode current collectors 212 are preferably electrically connected to one end portion of the secondary battery 101 and the plurality of negative electrode current collectors 214 are preferably electrically connected to the other end portion of the secondary battery 101. With such a structure, stress caused by the difference between the inner diameter and outer diameter of a curved portion, which is generated when the secondary battery 101 is curved in a later step, can be easily relieved.

Figure 6C:
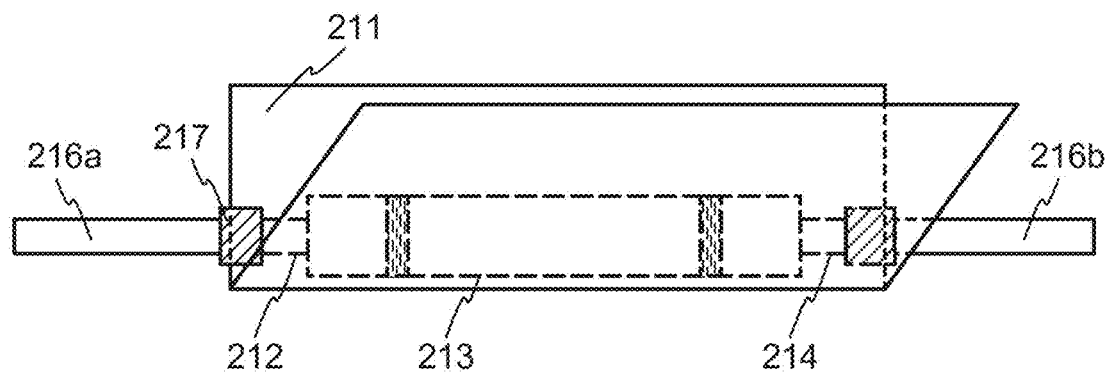

Next, as illustrated in FIG. 6C, the plurality of positive electrode current collectors 212, the plurality of negative electrode current collectors 214, the separator 213, the lead electrode 216a, and the lead electrode 216b are sandwiched by the exterior body 211 which is folded.

Figure 6D:
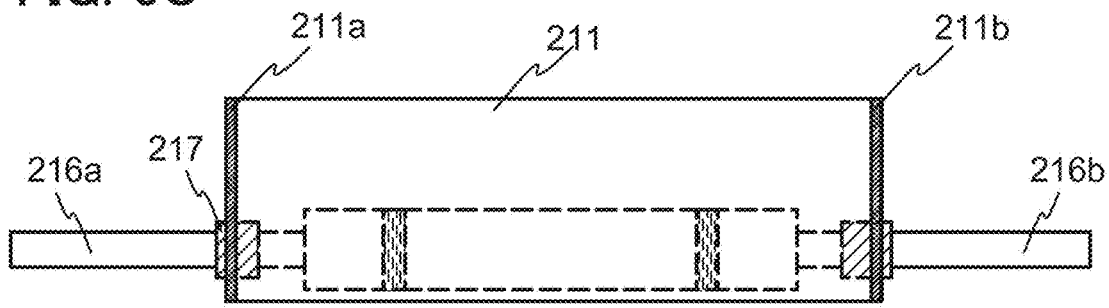

Then, as illustrated in FIG. 6D, two sides of the exterior body 211, i.e., a region 211a and a region 211b, are sealed by thermocompression bonding. At this time, the lead electrode 216a, the lead electrode 216b, and part of the sealant 217 are led to the outside of a region surrounded by the exterior body 211.

Figure 7A:
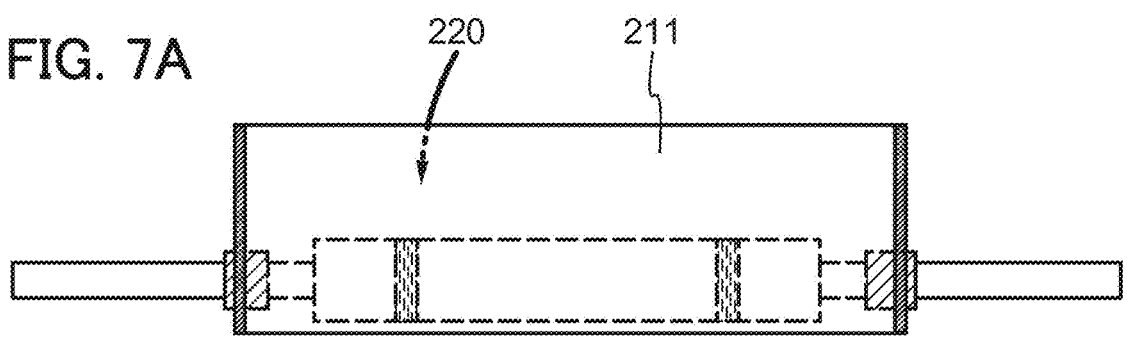
FIGS. 7A to 7C are top views and a perspective view illustrating a method for manufacturing a secondary battery which can be used in one embodiment of the present invention.

Next, as illustrated in FIG. 7A, the electrolyte solution 220 is injected into the region surrounded by the exterior body 211. The electrolyte solution 220 may be injected under reduced pressure as described below.

Figure 7B:
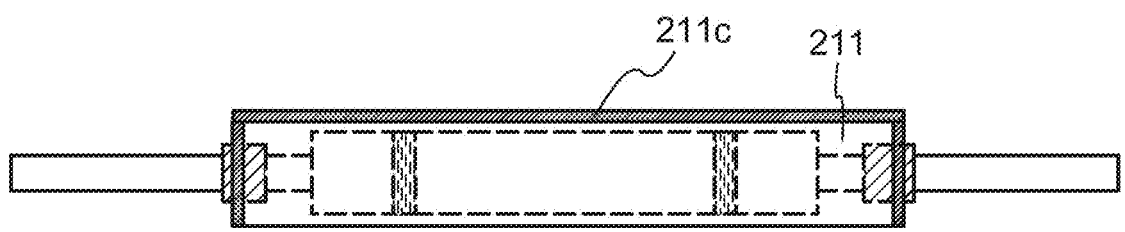

Then, by thermocompression bonding under reduced pressure, one remaining side of the exterior body 211, a region 211c, is sealed as illustrated in FIG. 7B. This treatment is performed in an environment from which oxygen is eliminated, for example, in a glove box. The reduction in pressure may be performed with a vacuum sealer, a liquid pouring vacuum sealer, or the like. By being sandwiched between two heatable bars included in the sealer, the region 211c can be sealed by thermocompression bonding. An example of the conditions of the reduction in pressure and hermocompression bonding is as follows: the degree of vacuum is 60 kPa, the heating temperature in thermocompression bonding is 190° C., the pressure is 0.1 MPa, and the time is 3 seconds.

Then, the secondary battery 101 obtained through the above-described steps is preferably subjected to aging treatment. By this aging treatment, formation of a film generated at the interface between the electrode and the electrolyte is controlled and the active material can be activated.

Furthermore, the secondary battery 101 that has been subjected to the aging treatment may be opened to let out a gas generated by the aging and then the electrolyte solution 220 may be added and sealing may be performed again. If a gas exists between the positive electrode and the negative electrode, the battery reaction occurs unevenly to cause deterioration of the secondary battery 101. The degassing and resealing steps can suppress deterioration of the secondary battery 101. In the case where degassing and resealing are performed after the aging treatment, a region for resealing is preferably left when the region 211c of the exterior body 211 is sealed.

Figure 7C:
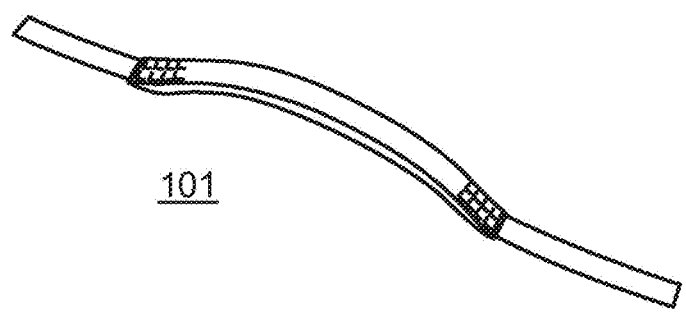

Next, the secondary battery 101 is curved as illustrated in FIG. 7C. Note that the curved secondary battery 101 may be used in an electronic device as illustrated in FIG. 7C or the secondary battery 101 may be curved together with an electronic device after the secondary battery 101 is included in the electronic device.

Through the above steps, the secondary battery 101 that can be used in one embodiment of the present invention can be fabricated.

Embodiment 3

In this embodiment, other examples of the electronic device of one embodiment of the present invention are described with reference to FIG. 8.

Although the glasses-type device 100 is described in Embodiment 1, one embodiment of the present invention is not limited thereto.

Figure 8:
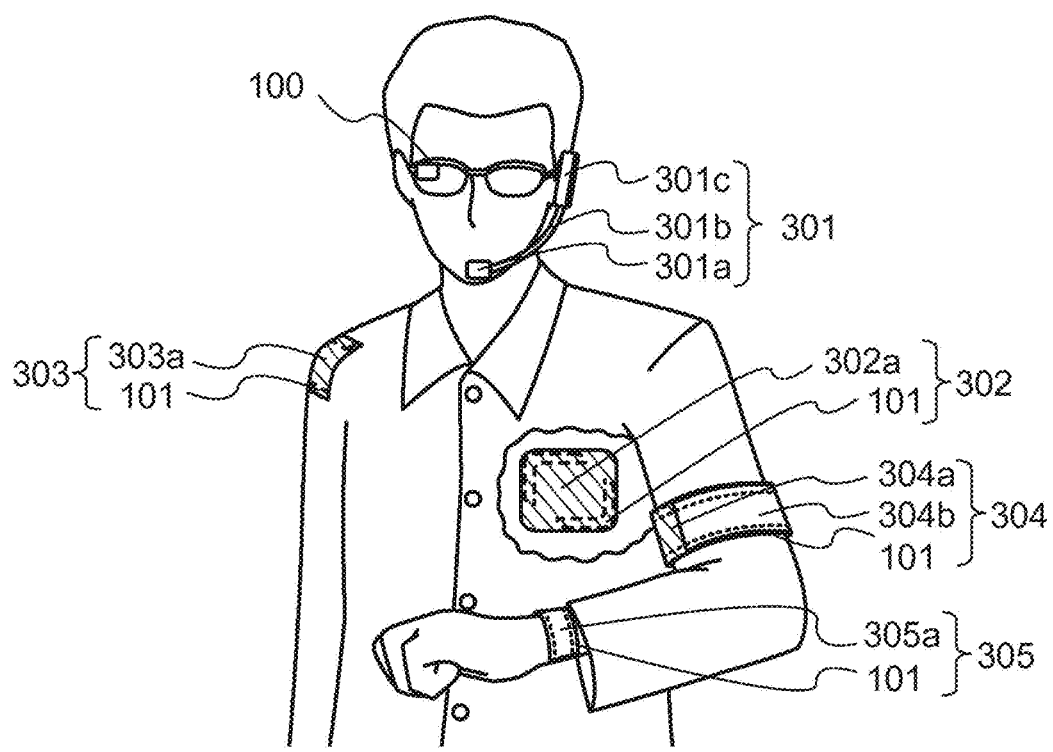
FIG. 8 illustrates another example of one embodiment of the present invention.

For example, a headset-type device 301 illustrated in FIG. 8 can be provided. The headset-type device 301 includes at least a microphone part 301a, a flexible pipe 301b, and an earphone part 301c. The plurality of secondary batteries 101 are provided in the flexible pipe 301b and the earphone part 301c.

Furthermore, a device 302 that can be attached directly to a body can be provided. The plurality of secondary batteries 101 are provided in a thin housing 302a of the device 302.

Furthermore, a device 303 that can be attached to clothes can be provided. The plurality of secondary batteries 101 are provided in a thin housing 303a of the device 303.

Furthermore, an armband device 304 can be provided. In the armband device 304, a display portion 304b is provided over a main body 304a and the plurality of secondary batteries 101 are provided in the main body 304a.

Furthermore, a watch-type device 305 can be provided. The watch-type device 305 includes a display portion 305a and the plurality of secondary batteries 101 are provided in the main body of the watch-type device 305.

Embodiment 4

In this embodiment, a wireless system that can be used for the electronic device of one embodiment of the present invention is described.

As described in Embodiment 1, for example, wireless communication and wireless power feeding can be performed between the glasses-type device 110 and the external display portion 112. In addition, the wireless system can be used for an electronic device by which wireless communication with the outside is performed.

Furthermore, the wireless system can also be used for an electronic device which does not have a terminal portion for charging and which can be charged by wireless power feeding from the outside. Such an electronic device can be easily charged and the water resistance and the dust resistance of the electronic device can be improved because the electronic device does not have a terminal portion for charging.

Figure 9:
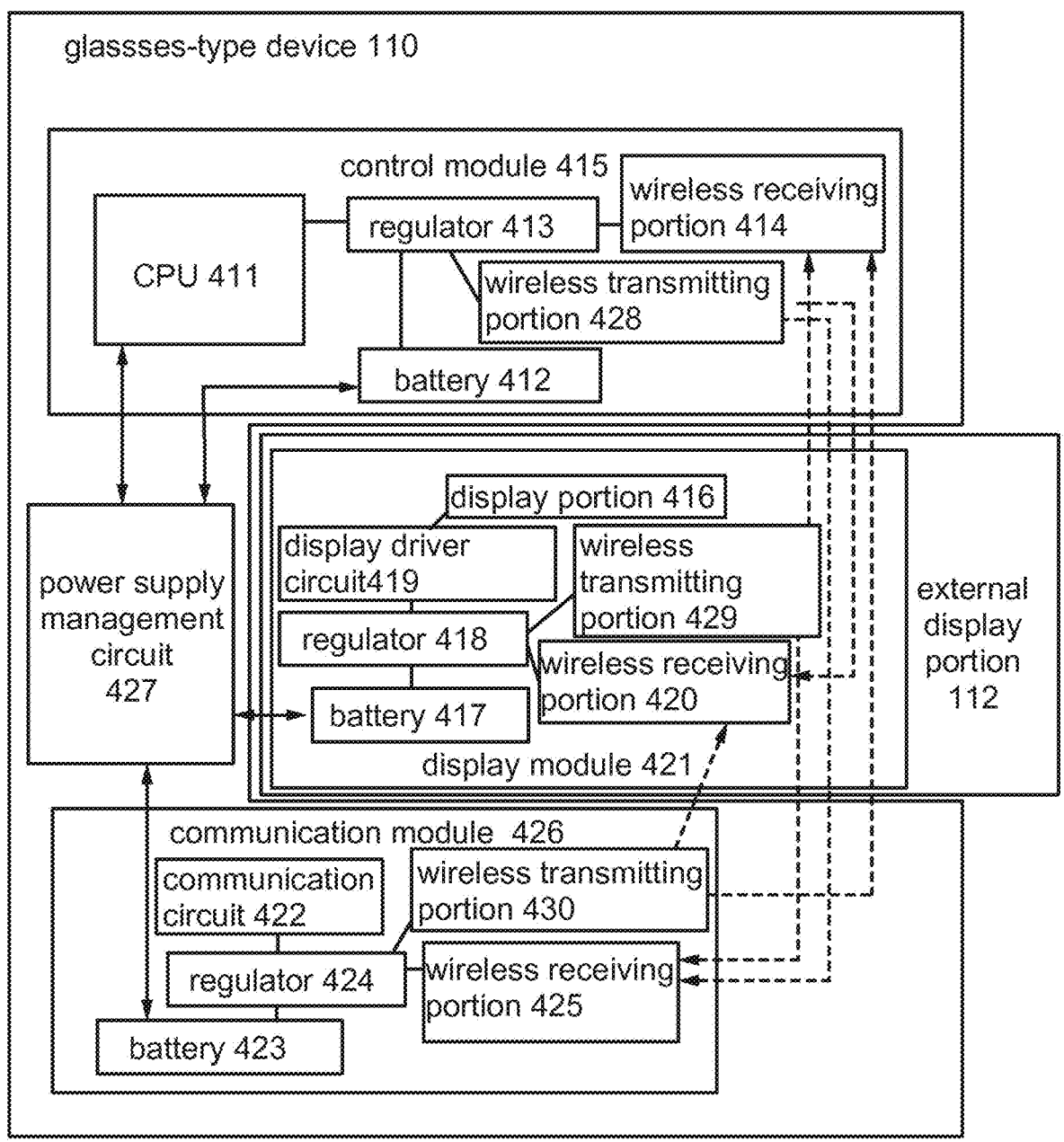
FIG. 9 is a block diagram illustrating a wireless system which can be used in one embodiment of the present invention.

A wireless system is described below using the glasses-type device 110 and the external display portion 112 as examples. FIG. 9 is a block diagram of the glasses-type device 110 and the external display portion 112.

The glasses-type device 110 of this embodiment includes a control module 415, a communication module 426, and a power supply management circuit 427. The external display portion 112 includes a display module 421. The control module 415 is a controller that controls the entire glasses-type device 110, communication, and display of information on a display portion 416, and can be provided in the control portion 103 of the glasses-type device 110, for example.

The control module 415 includes a CPU 411, a battery 412, a regulator 413, a wireless receiving portion 414, and a wireless transmitting portion 428. As the battery 412, the secondary battery 101 can be used.

The display module 421 includes the display portion 416, a display driver circuit 419, a battery 417, a regulator 418, a wireless receiving portion 420, and a wireless transmitting portion 429. Although an example in which the glasses-type device 110 includes the external display portion 112 is shown in this embodiment, this embodiment is not limited thereto, and a sensor portion or the like can be provided in place of the display portion.

The communication module 426 includes a communication circuit 422, a battery 423, a regulator 424, a wireless receiving portion 425, and a wireless transmitting portion 430. As the battery 423, the secondary battery 101 can be used.

Each module includes a regulator and a battery. Each regulator generates and supplies power or a signal needed for each functional circuit from the battery connected to the regulator. In addition, the regulator can prevent overcharge and the like when the battery is charged. Although an example in which a wireless receiving portion and a wireless transmitting portion are connected to one regulator is shown in FIG. 9, a regulator connected to a wireless receiving portion and a regulator connected to a wireless transmitting portion may be separately provided.

In the glasses-type device 110, the power supply management circuit 427 enables electric power of the batteries in different modules to be mutually supplied. In addition, the power supply management circuit 427 monitors the amount of electric power of the batteries 412, 417, and 423, and can charge one of the batteries with electric power wirelessly supplied from another battery automatically or by operation of the user as appropriate. Alternatively, the power supply management circuit 427 monitors the amount of electric power of the batteries 412, 417, and 423, and can charge one of batteries with electric power wirelessly supplied from the plurality of batteries automatically or by operation of the user as appropriate.

In addition, in the glasses-type device 110, the modules can be individually turned on or off. The operating system that selectively drives only the module to be used can reduce power consumption of the glasses-type device 110.

For example, when the user looks at information on the display portion 416 without using a communication function, the communication circuit 422 is in an off state where the battery 423 is not used in order that power supply to the communication circuit 422 is blocked in the communication module 426, while the display module 421 and the control module 415 are in an on state.

After the display module 421 and the control module 415 are turned on to display a still image on the display portion 416, the still image can keep being displayed while only the display module 421 is on even after the control module 415 is turned off while the still image is displayed. Note that in the case where a transistor of the display portion 416 includes an oxide semiconductor layer, which allows a low off-state current (e.g., an oxide material containing In, Ga, and Zn), or in the case where a memory is included in each pixel, a still image can keep being displayed for a certain period of time even when power supply from the battery 417 is stopped after the still image is displayed.

In this embodiment, an example in which the display module 421, the control module 415, and the communication module 426 each have a battery is described; however, the total number of batteries is not limited to three. The electronic device may additionally include functional modules and their batteries, in which case the electronic device has four or more batteries in total.

Example 1

In this example, a secondary battery 1101 and a glasses-type device 1100 were actually fabricated and they are described with reference to FIGS. 10A to 10C, FIGS. 11A to 11C, FIGS. 12A and 12B, and FIG. 13.

In the secondary battery 1101 fabricated in this example, 20-μm-thick aluminum was used as a positive electrode current collector, and 18-μm-thick copper was used as a negative electrode current collector.

Furthermore, $LiCoO_2$ was used as a positive electrode active material, acetylene black (AB) and PVDF as a conductive additive and a binder were mixed to $LiCoO_2$, and the mixture was used as a positive electrode active material layer. The proportion of the mixture of $LiCoO_2$, AB, and PVDF was as follows: $LiCoO_2$ at 90 weight %, AB at 5 weight %, and PVDF at 5 weight %.

Graphite was used as a negative electrode active material, a vapor grown carbon fiber (VGCF (registered trademark)), carboxymethyl cellulose (CMC), and styrene-butadiene rubber (SBR) as a conductive additive and a binder were mixed to the graphite, and the mixture was used as a negative electrode active material layer. The proportion of the mixture of graphite, VGCF (registered trademark), CMC, and SBR was as follows: graphite at 96 weight %, VGCF (registered trademark) at 1 weight %, CMC at 1 weight %, and SBR at 2 weight %.

As a positive electrode, five positive electrode current collectors 1212 each of which has surfaces coated with an active material were used. As a negative electrode, ten negative electrode current collectors 1214 each of which has one surface coated with an active material were used.

As a separator 1213, polypropylene was used. Furthermore, 1.2 mol/L of $LiPF_6$ was dissolved in an organic solvent in which EC, DEC, and EMC were mixed at a weight ratio of 3:6:1, and 0.5 weight % of propanesultone (PS) and 0.5 weight % of vinylene carbonate (VC) were added thereto as an additive. The resulting solution was used as an electrolytic solution.

As an exterior body 1211, an aluminum laminate film subjected to embossing was used. As the aluminum laminate film, 35-μm-thick aluminum one surface of which was provided with a 15-μm-thick nylon resin and the other surface of which was provided with a stack including an acid-proof polypropylene film and a polypropylene film which have a total thickness of 35 μm was used.

Figure 10A:
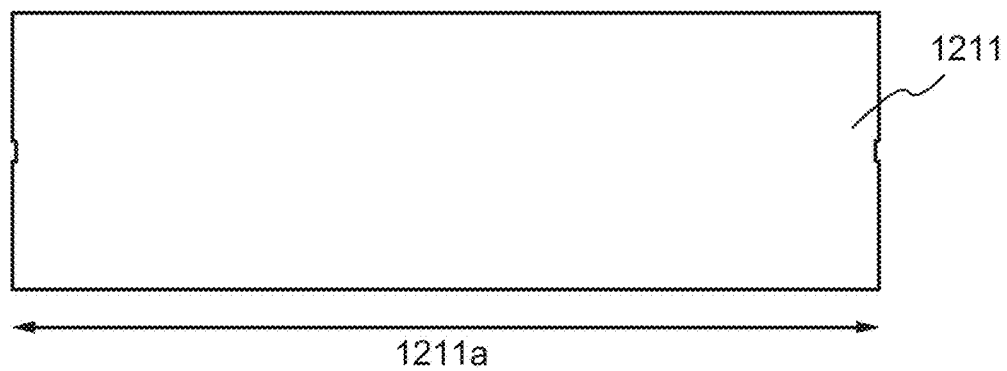
FIGS. 10A to 10C are design diagrams of a secondary battery fabricated in Example 1.
Figure 10B:
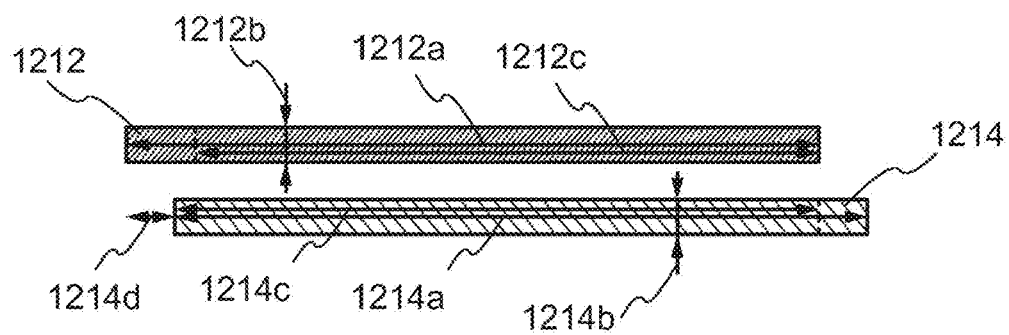
Figure 10C:
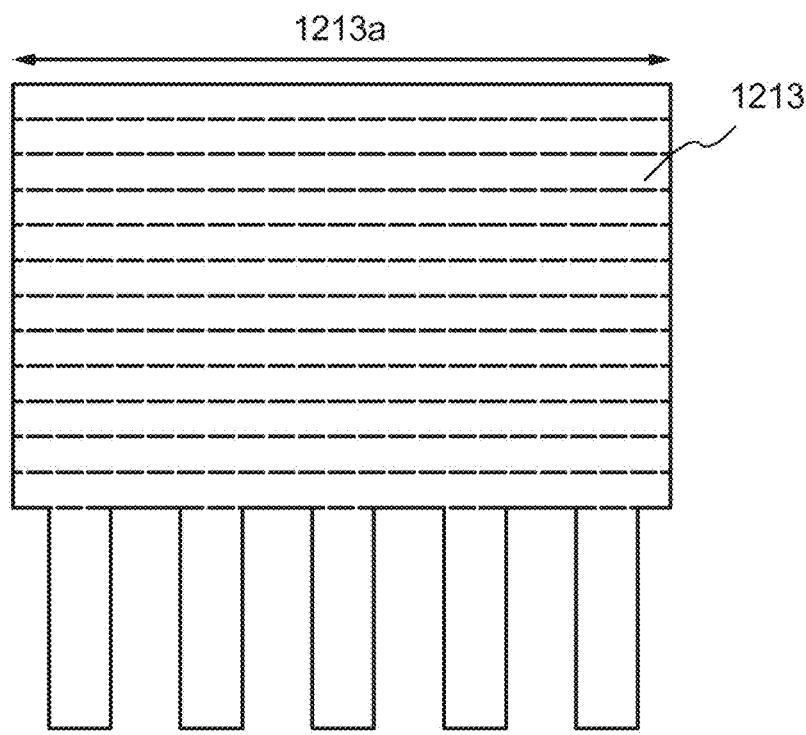

FIGS. 10A to 10C are design diagrams of the exterior body 1211, the positive electrode current collector 1212, the negative electrode current collector 1214, and the separator 1213, which were used in this example.

A width 1211a of the exterior body 1211 in FIG. 10A was 125 mm.

The length of a long side 1212a of the positive electrode current collector 1212 in FIG. 10B was 100 mm, and the length of a short side 1212b thereof was 5 mm. Furthermore, a width 1212c of a portion coated with the positive electrode active material of the long side 1212a was 90 mm.

The length of a long side 1214a of the negative electrode current collector 1214 was 100 mm, and the length of a short side 1214b thereof was 5 mm. Furthermore, a width 1214c of a portion coated with the negative electrode active material of the long side 1214a was 93 mm. Furthermore, a width 1214d of a region where the positive electrode current collector 1212 and the negative electrode current collector 1214 do not overlap with each other was 7 mm.

A width 1213a of the separator 1213 in FIG. 10C was 95 mm. In this example, the separator from which part of a region covering the plurality of positive electrode current collectors 1212 and the plurality of negative electrode current collectors 1214 had been removed as in FIGS. 3B and 3C was used.

The secondary battery was fabricated using the above materials through the process described in Embodiment 2. In the stacked-layer structure of the positive electrode current collectors 1212 and the negative electrode current collectors 1214, as illustrated in FIG. 4A, the positive electrode active material layer 212A and the negative electrode active material layer 214A were stacked to face each other with the separator 213 provided therebetween. Furthermore, the negative electrode current collectors 214 were stacked so that surfaces on which the negative electrode active material layer was not provided were in contact with each other.

Figure 11A:
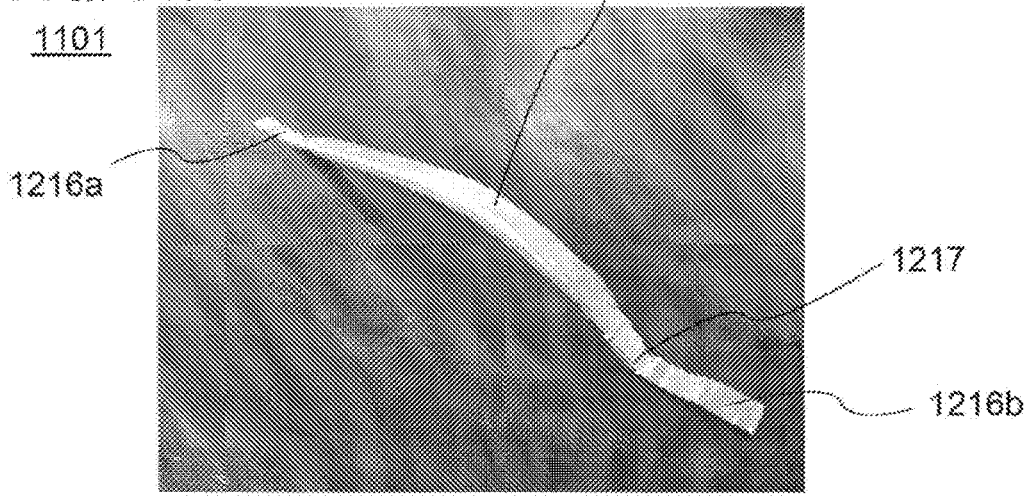
FIGS. 11A to 11C are photographs of a secondary battery and an electronic device fabricated in Example 1.

FIG. 11A shows an external view of the secondary battery 1101 fabricated in the above manner. The secondary battery 1101 was covered with the exterior body 1211, and parts of the lead electrode 1216a and the lead electrode 1216b were led to the outside of the exterior body 1211. The exterior body 1211 and each of the lead electrode 1216a and the lead electrode 1216b were bonded to each other with a sealant 1217.

Note that the length of the long side of the exterior body 1211 was 125 mm before the secondary battery was curved. The length of the short side of the exterior body 1211 was 6 mm and the thickness thereof was 3.5 mm. The weight of the secondary battery 1101 was 4.5 g.

Figure 11B:
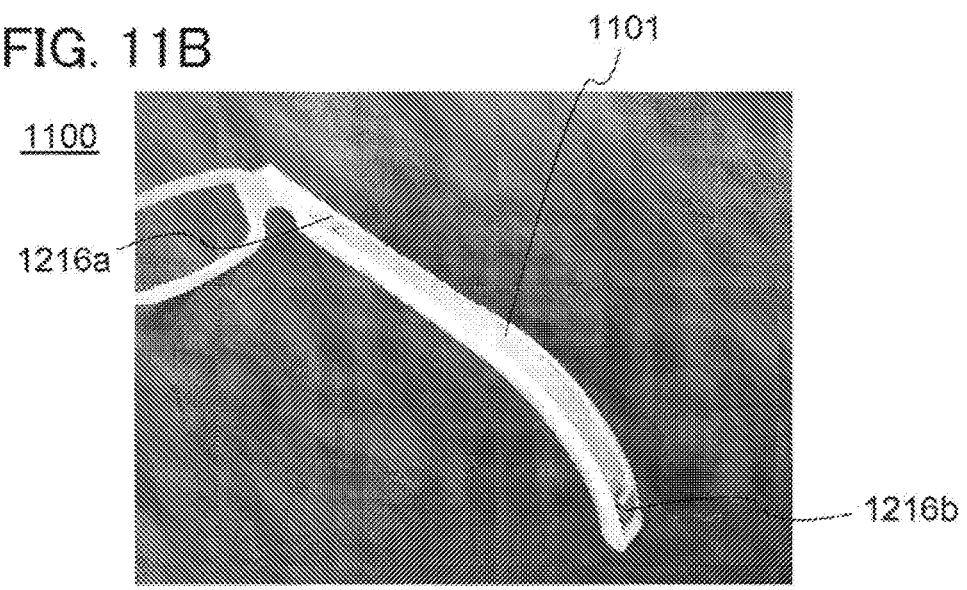
Figure 11C:
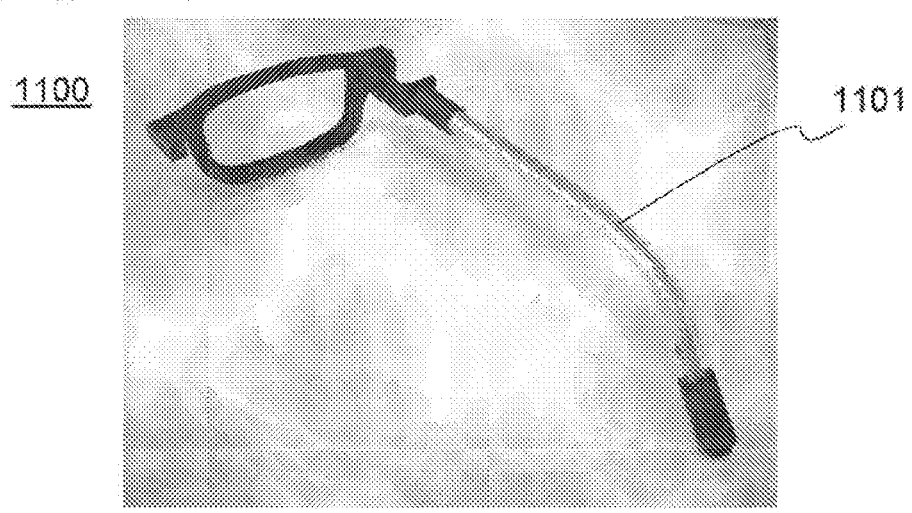

Then, as illustrated in FIGS. 11B and 11C, in a temple of the glasses-type device 1100, the secondary battery 1101 that was curved in a portion close to the lead electrode 1216b to which the negative electrode current collectors 214 were electrically connected was positioned. As in FIG. 11B, the secondary battery 1101 was positioned to be curved along the temple, and the curvature radius of the curved portion was 40 mm. As in FIG. 11C, a resin was tied around the curved secondary battery 1101 to form a temple.

Figure 12A:
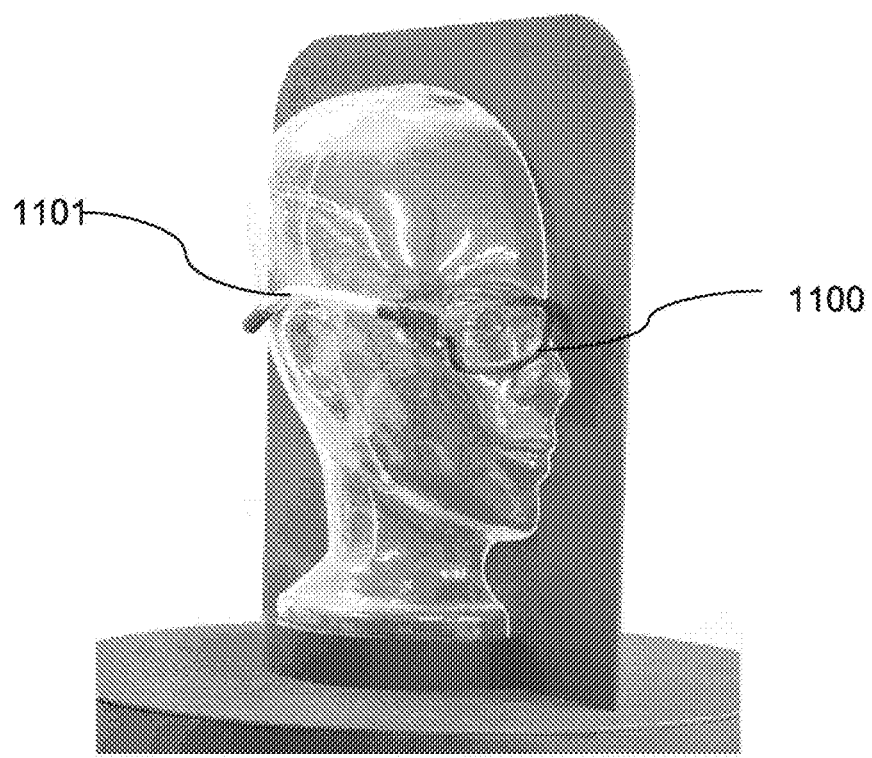
FIGS. 12A and 12B are photographs of a secondary battery and an electronic device fabricated in Example 1.
Figure 12B:
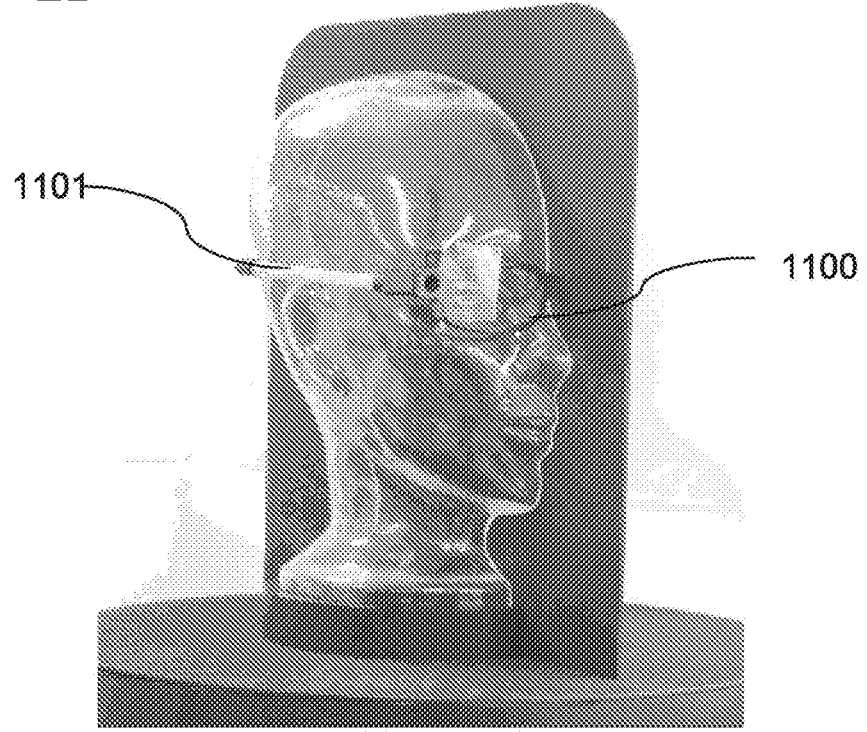

Application examples of the glasses-type device 1100 are shown in FIGS. 12A and 12B. FIG. 12A shows the glasses-type device 1100 provided with a light-emitting device and FIG. 12B shows the glasses-type device 1100 provided with a light-emitting device and a display device.

In each of the glasses-type devices 1100 shown in FIGS. 12A and 12B, the temple was formed by tying a resin around the curved secondary battery 1101.

Figure 13:
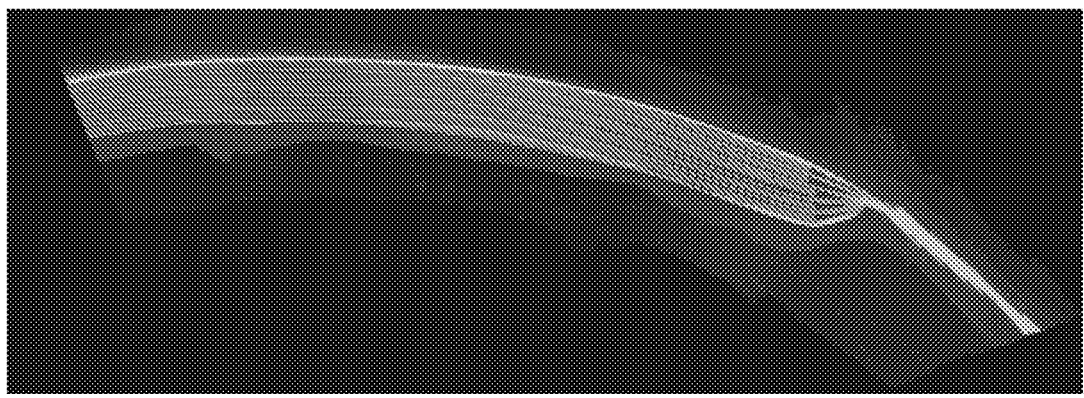
FIG. 13 is an X-ray CT image of a secondary battery fabricated in Example 1.

In addition, FIG. 13 is an X-ray CT image of the secondary battery 1101 shown in FIGS. 11B and 11C and FIGS. 12A and 12B.

As shown in FIG. 13, in the secondary battery 1101, there were no abnormalities in the current collector and the active material layer even when the secondary battery was curved.

Example 2

In this example, evaluation results of the charge and discharge characteristics of the secondary battery 1101 fabricated in Example 1 are described.

First, constant current (CC) charging, constant current constant voltage (CCCV) charging, and CC discharging are described.

<CC Charging>

Figure 14A:
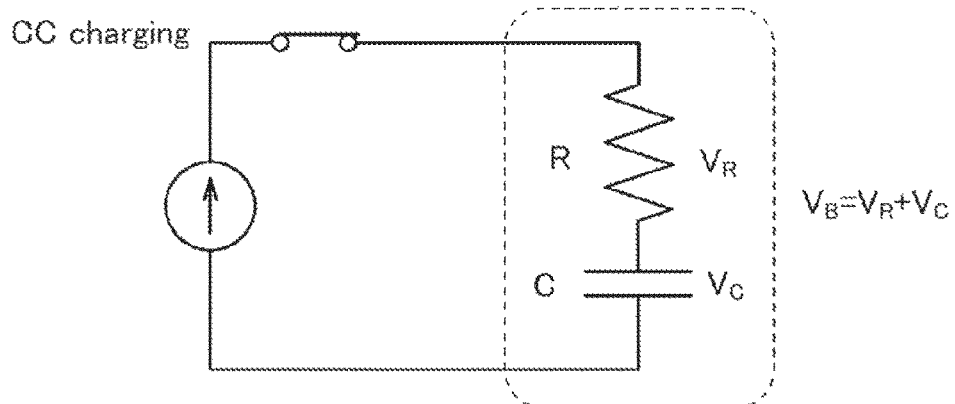
FIGS. 14A to 14C show a charge/discharge test.

CC charging is described. CC charging is a charging method in which a constant current is made to flow to a secondary battery in the whole charging period and charging is terminated when the voltage reaches a predetermined voltage. The secondary battery is assumed to be expressed by an equivalent circuit with internal resistance R and secondary battery capacity C as illustrated in FIG. 14A. In this case, a secondary battery voltage $V_B$ is the sum of a voltage $V_R$ applied to the internal resistance R and a voltage $V_C$ applied to the secondary battery capacity C.

While the CC charging is performed, a switch is on as illustrated in FIG. 14A, so that a constant current I flows to the secondary battery. During the period, the current I is constant; thus, according to the Ohm's law ($V_R$=R×I), the voltage $V_R$ applied to the internal resistance R is also constant. In contrast, the voltage $V_C$ applied to the secondary battery capacity C increases over time. Accordingly, the secondary battery voltage $V_B$ increases over time.

Figure 14B:
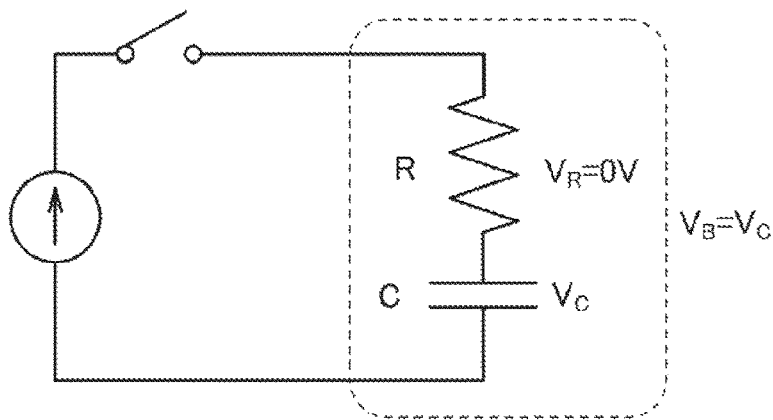

When the secondary battery voltage $V_B$ reaches a predetermined voltage, e.g., 4.1 V, the charging is terminated. On termination of the CC charging, the switch is turned off as illustrated in FIG. 14B, and the current I becomes 0. Thus, the voltage $V_R$ applied to the internal resistance R becomes 0 V. Consequently, the secondary battery voltage $V_B$ is decreased by the lost voltage drop in the internal resistance R.

Figure 14C:
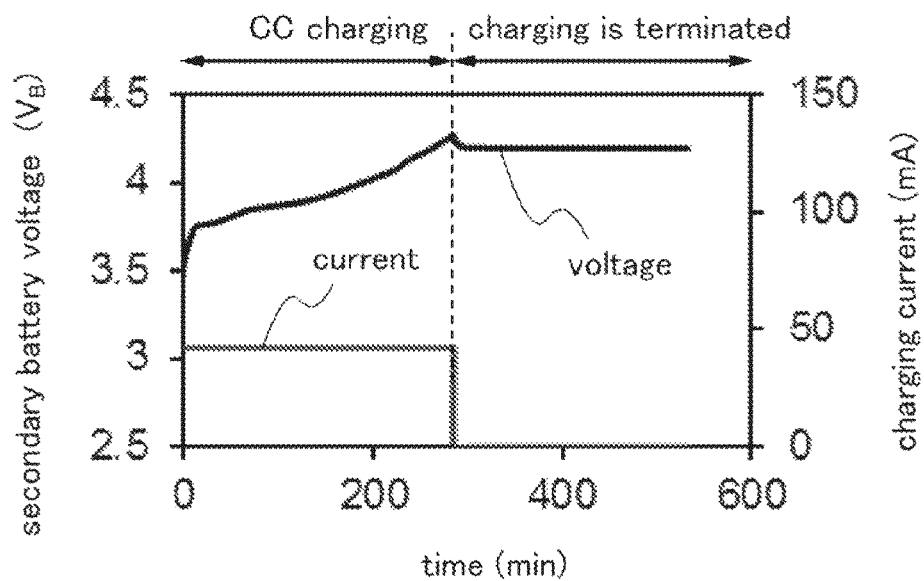

FIG. 14C shows an example of the secondary battery voltage $V_B$ and charging current while the CC charging is performed and after the CC charging is terminated. The secondary battery voltage $V_B$ increases while the CC charging is performed, and slightly decreases after the CC charging is terminated.

<CCCV Charging>

Next, CCCV charging will be described. CCCV charging is a charging method in which CC charging is performed until the voltage reaches a predetermined voltage and then CV (constant voltage) charging is performed until the amount of current flow becomes small, specifically, a termination current value.

Figure 15A:
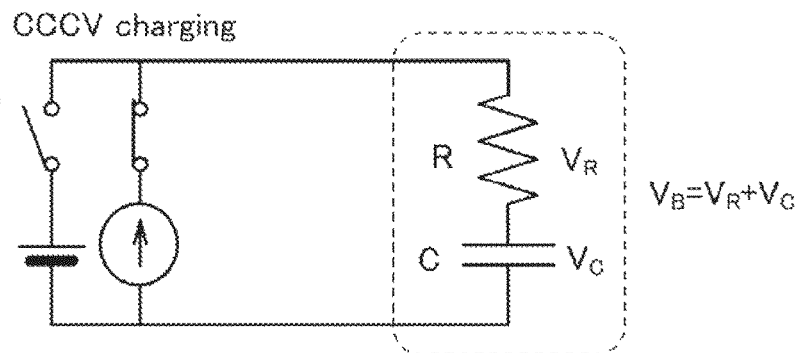
FIGS. 15A to 15D show a charge/discharge test.

While the CC charging is performed, a switch of a constant current power source is on and a switch of a constant voltage power source is off as illustrated in FIG. 15A, so that the constant current I flows to a secondary battery. During the period, the current I is constant; thus, according to the Ohm's law ($V_R$=R×I), the voltage $V_R$ applied to the internal resistance R is also constant. In contrast, the voltage $V_C$ applied to the secondary battery capacity C increases over time. Accordingly, the secondary battery voltage $V_B$ increases over time.

Figure 15B:
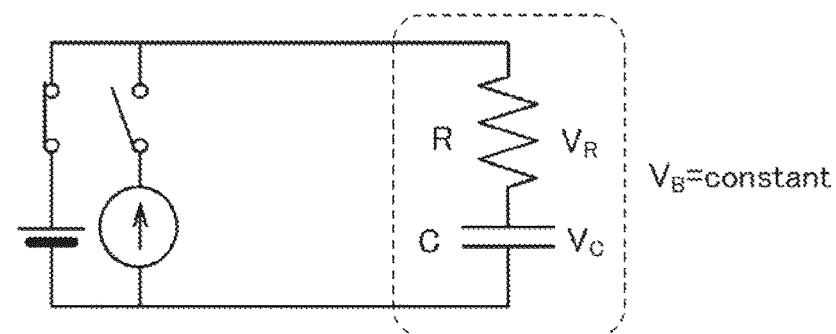

When the secondary battery voltage $V_B$ reaches a predetermined voltage, e.g., 4.1 V, switching is performed from the CC charging to the CV charging. While the CV charging is performed, the switch of the constant voltage power source is on and the switch of the constant current power source is off as illustrated in FIG. 15B; thus, the secondary battery voltage $V_B$ is constant. In contrast, the voltage $V_C$ applied to the secondary battery capacity C increases over time. Since $V_B$=$V_R$+$V_C$ is satisfied, the voltage $V_R$ applied to the internal resistance R decreases over time. As the voltage $V_R$ applied to the internal resistance R decreases, the current I flowing to the secondary battery also decreases according to the Ohm's law ($V_R$=R×I).

Figure 15C:
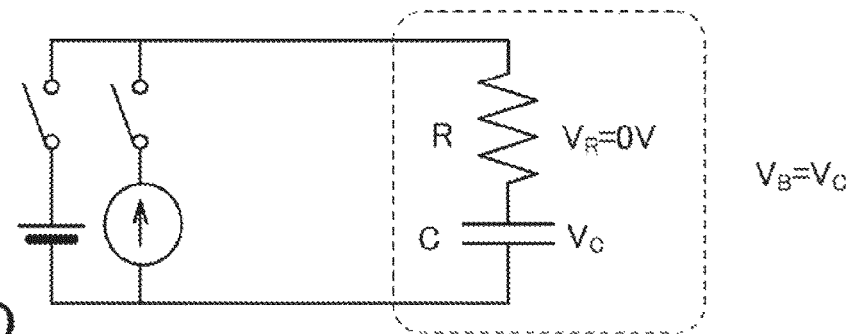

When the current I flowing to the secondary battery becomes a predetermined current, e.g., approximately 0.01 C, charging is terminated. On termination of the CCCV charging, all the switches are turned off as illustrated in FIG. 15C, so that the current I becomes 0. Accordingly, the voltage $V_R$ applied to the internal resistance R becomes 0 V. However, the voltage $V_R$ applied to the internal resistance R becomes sufficiently small by the CV charging; thus, even when a voltage drop no longer occurs in the internal resistance R, the secondary battery voltage $V_B$ hardly decreases.

Figure 15D:
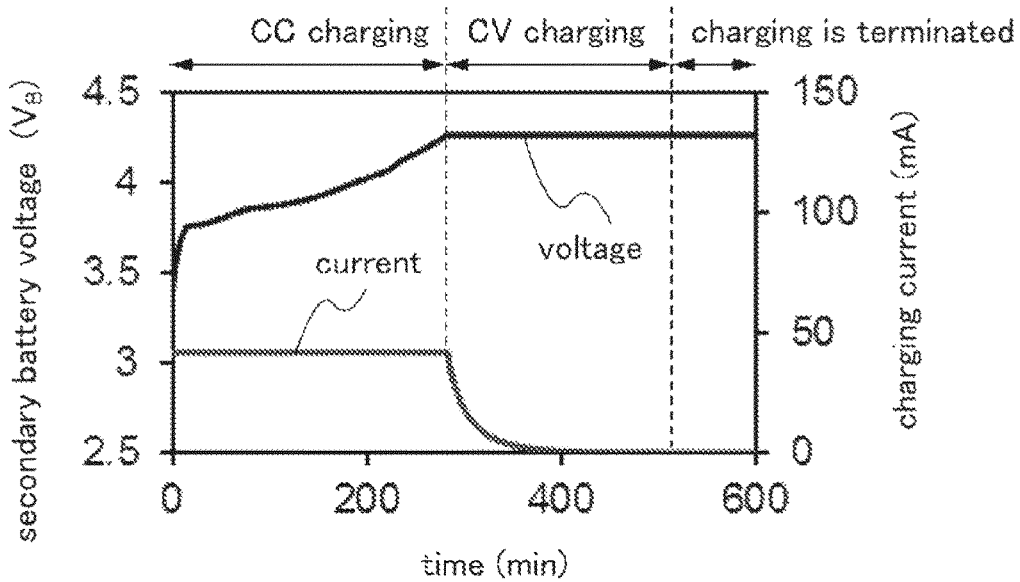

FIG. 15D shows an example of the secondary battery voltage $V_B$ and charging current while the CCCV charging is performed and after the CCCV charging is terminated. Even after the CCCV charging is terminated, the secondary battery voltage $V_B$ hardly decreases.

<CC Discharging>

Next, CC discharging will be described. CC discharging is a discharging method in which a constant current is made to flow from a secondary battery in the whole discharging period and discharging is ended when the secondary battery voltage $V_B$ reaches a predetermined voltage, e.g., 2.5 V.

Figure 16:
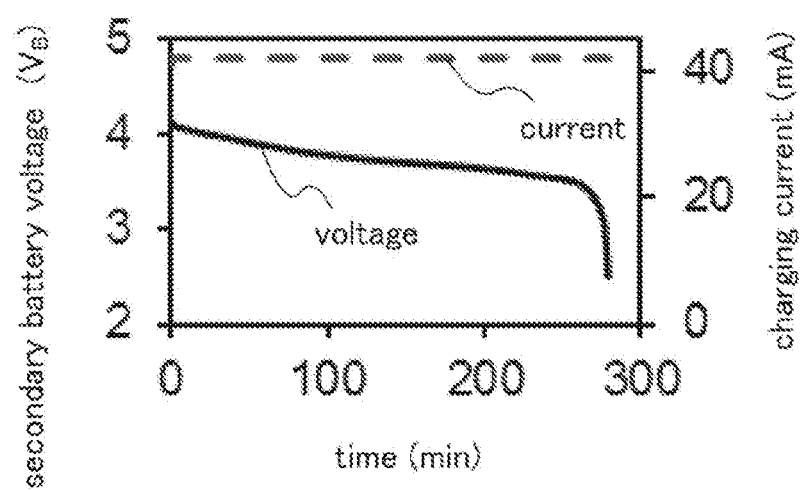
FIG. 16 shows a charge/discharge test.

FIG. 16 shows an example of the secondary battery voltage $V_B$ and charging current while the CC discharging is performed. As discharging proceeds, the secondary battery voltage $V_B$ decreases.

Next, a charge rate and a discharge rate will be described. The discharge rate refers to the relative ratio of discharging current to battery capacity and is expressed in a unit C. A current of approximately 1 C in a battery with a rated capacity X (Ah) is X A. The case where discharging is performed at a current of 2X A is rephrased as follows: discharging is performed at 2 C. The case where discharging is performed at a current of X/5 A is rephrased as follows: discharging is performed at 0.2 C. Similarly, the case where charging is performed at a current of 2X A is rephrased as follows: charging is performed at 2 C, and the case where charging is performed at a current of X/5 A is rephrased as follows: charging is performed at 0.2 C.

Figure 17A:
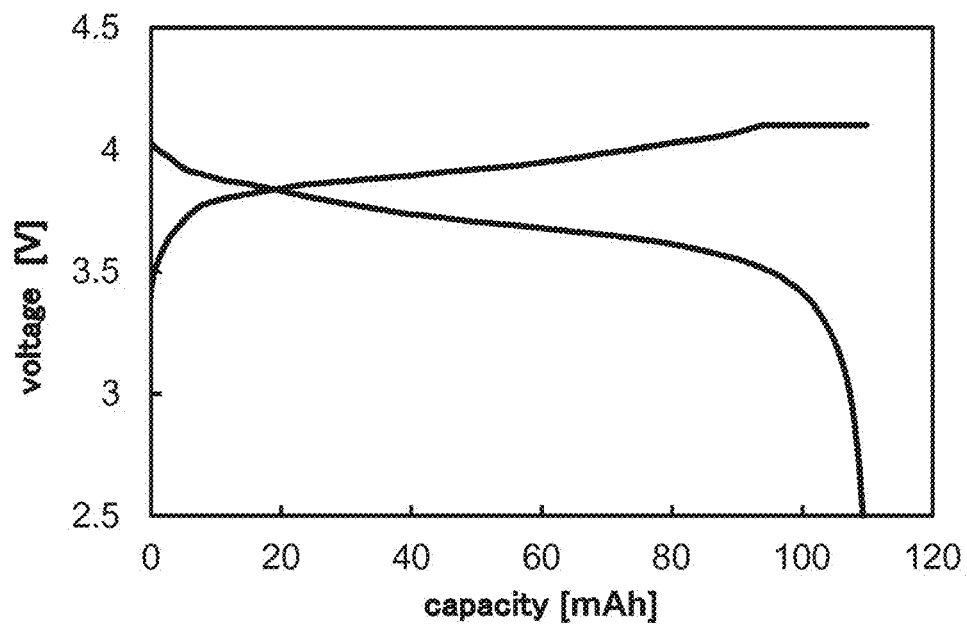
FIGS. 17A and 17B show charge and discharge characteristics of a secondary battery measured in Example 2.
Figure 17B:
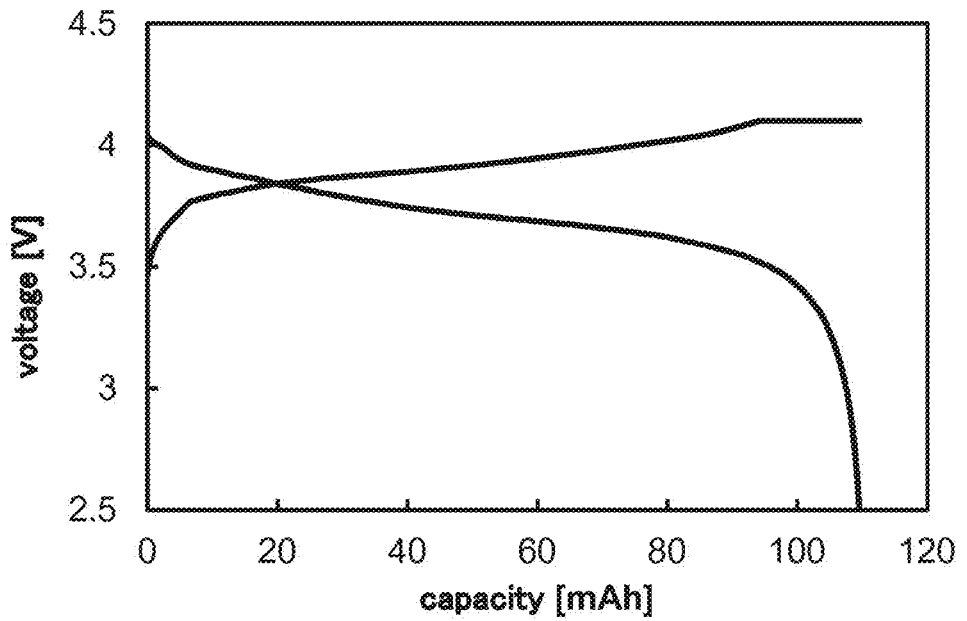

FIG. 17A shows measurement results of charge and discharge characteristics in the state where the secondary battery 1101 was flat. In addition, FIG. 17B shows measurement results of charge and discharge characteristics in the state where the end portion of the secondary battery 1101 was curved with a curvature radius of 40 mm as shown in FIG. 11B and FIGS. 12A and 12B. Note that the charging was performed under the following conditions: CCCV charging that corresponds to 0.2 C; a termination voltage of CC charging of 4.1 V; and a termination current of CV charging of 0.01 C. The discharging was performed under the following conditions: CC discharging that corresponds to 0.2 C; and a termination voltage of 2.5 V.

The charge and discharge characteristics in the flat state in FIG. 17A are almost consistent with those in the curved state in FIG. 17B. Thus, it is found that the secondary battery 1101 can have favorable charge and discharge characteristics even if the secondary battery 1101 is curved. Furthermore, it is found that the capacity of the secondary battery 1101 is 110 mAh.

This application is based on Japanese Patent Application serial no. 2014-160050 filed with Japan Patent Office on Aug. 6, 2014, and Japanese Patent Application serial no. 2014-218032 filed with Japan Patent Office on Oct. 27, 2014, the entire contents of which are hereby incorporated by reference.

What is claimed is:
1. An electronic device comprising a secondary battery, wherein the secondary battery includes a first positive electrode current collector, a second positive electrode current collector, a first negative electrode current collector, and a second negative electrode current collector, wherein the first positive electrode current collector and the second positive electrode current collector are electrically connected to each other at a first side of the secondary battery, wherein the first negative electrode current collector and the second negative electrode current collector are electrically connected to each other at a second side of the secondary battery, wherein the secondary battery includes a curved portion, wherein the curved portion is closer to the second side than a midpoint of a long side of the secondary battery, wherein the first negative electrode current collector is provided with a negative electrode active material layer on a first surface and is not provided with a negative electrode active material layer on an entirety of a second surface, wherein the second negative electrode current collector is not provided with a negative electrode active material layer on an entirety of a first surface and is provided with a negative electrode active material layer on a second surface, wherein the second surface of the first negative electrode current collector and the first surface of the second negative electrode current collector are in direct contact with each other, and wherein the entirety of the second surface of the first negative electrode current collector and the entirety of the first surface of the second negative electrode current collector are regions that are not coated with the negative electrode active material layers.

2. The electronic device according to claim 1, wherein a length of a long side of the first positive electrode current collector is ten times or more a length of a short side of the first positive electrode current collector, wherein a length of a long side of the first negative electrode current collector is ten times or more a length of a short side of the first negative electrode current collector, wherein a length of a long side of the second positive electrode current collector is ten times or more a length of a short side of the second positive electrode current collector, and wherein a length of a long side of the second negative electrode current collector is ten times or more a length of a short side of the second negative electrode current collector.

3. The electronic device according to claim 2, wherein the length of the short side of the first positive electrode current collector is shorter than or equal to 6 mm, wherein the length of the short side of the first negative electrode current collector is shorter than or equal to 6 mm, wherein the length of the short side of the second positive electrode current collector is shorter than or equal to 6 mm, and wherein the length of the short side of the second negative electrode current collector is shorter than or equal to 6 mm.

4. The electronic device according to claim 1, wherein the first positive electrode current collector, the first negative electrode current collector, the second positive electrode current collector, and the second negative electrode current collector overlap one another, and wherein the secondary battery includes a separator which is folded and extends from over the first positive electrode current collector to under the second negative electrode current collector through a region between the first positive electrode current collector and the first negative electrode current collector, a region between the first negative electrode current collector and the second positive electrode current collector, and a region between the second positive electrode current collector and the second negative electrode current collector.

5. The electronic device according to claim 1, wherein the first side of the secondary battery and the second side of the secondary battery are opposite from each other in the long side of the secondary battery.

6. The electronic device according to claim 1, wherein the curved portion is between the first side of the secondary battery and the second side of the secondary battery, in the long side of the secondary battery.

7. The electronic device according to claim 1, wherein each of the first negative electrode current collector and the second negative electrode current collector includes a curved portion.

8. Electronic glasses comprising a temple, wherein the secondary battery according to claim 1 is in the temple.

* * * * *